(12) United States Patent
Suzuki et al.

(10) Patent No.: US 8,773,644 B2
(45) Date of Patent: Jul. 8, 2014

(54) OPTICAL BEAM SCANNER AND LASER RADAR UNIT

(71) Applicants: Shuichi Suzuki, Kanagawa (JP); Mitsuru Nakajima, Kanagawa (JP); Kenichi Yoshimura, Kanagawa (JP)

(72) Inventors: Shuichi Suzuki, Kanagawa (JP); Mitsuru Nakajima, Kanagawa (JP); Kenichi Yoshimura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/622,583

(22) Filed: Sep. 19, 2012

(65) Prior Publication Data
US 2013/0077083 A1    Mar. 28, 2013

(30) Foreign Application Priority Data

Sep. 22, 2011  (JP) ................................. 2011-208009
Sep. 26, 2011  (JP) ................................. 2011-209982
Jun. 29, 2012  (JP) ................................. 2012-147398

(51) Int. Cl.
*G01C 3/08*  (2006.01)

(52) U.S. Cl.
USPC ....... 356/4.01; 356/3.01; 356/4.07; 356/5.01; 356/5.09; 356/9; 356/625

(58) Field of Classification Search
USPC ............................ 356/3.01, 4.01, 5.01, 9, 625
See application file for complete search history.

(56) References Cited

U.S. PATENT DOCUMENTS 4,534,183 A *  8/1985  Hashimoto et al. ............. 62/374
5,080,457 A    1/1992  Fetzer et al.
5,751,407 A    5/1998  Yamabuchi
5,864,391 A    1/1999  Hosokawa et al.
5,933,225 A    8/1999  Yamabuchi
6,317,202 B1  11/2001  Hosokawa et al.

(Continued)

FOREIGN PATENT DOCUMENTS

| DE | 32 17 785 C1 | 12/1983 |
| EP | 1 215 875 A2 | 6/2002 |
| EP | 2 293 013 A2 | 3/2011 |
| EP | 2293013 A2 * | 3/2011 |

(Continued)

OTHER PUBLICATIONS

Partial Search Report issued Dec. 10, 2012 in European Patent Application No. 12185132.3.

*Primary Examiner* — Luke Ratcliffe
*Assistant Examiner* — Samantha K Abraham
(74) *Attorney, Agent, or Firm* — Oblon, Spivak, McClelland, Maier & Neustadt, L.L.P.

(57) ABSTRACT

An optical beam scanner includes a light source, an optical scanner configured to scan a light beam irradiated from the light source, and an input optical system configured to direct the light beam irradiated from the light source to the optical scanner, wherein the optical scanner includes a rotating mirror configured to rotate around a rotational axis and reflect the light beam irradiated from the light source; the rotating mirror is rotated around the rotational axis so that the light beam is irradiated on differing positions of a mirror surface of the rotating mirror; and the mirror surface of the rotating mirror has a mirror surface inclining angle with respect to a direction parallel to the rotational axis that is arranged to gradually increase from a first side to a second side of the rotating mirror in a direction parallel to a plane perpendicular to the rotational axis.

15 Claims, 36 Drawing Sheets

(56) References Cited

U.S. PATENT DOCUMENTS

| | | | | |
|---|---|---|---|---|
| 6,654,151 | B1* | 11/2003 | Yamaguchi | 359/220.1 |
| 7,016,098 | B2* | 3/2006 | Giles et al. | 359/290 |
| 7,726,857 | B2* | 6/2010 | Nakada et al. | 362/518 |
| 7,777,935 | B2* | 8/2010 | Nanjyo et al. | 359/290 |
| 7,787,029 | B2* | 8/2010 | Watanabe et al. | 348/240.1 |
| 2002/0075381 | A1 | 6/2002 | Wilson | |
| 2004/0198524 | A1* | 10/2004 | Kwon | 473/151 |
| 2007/0247562 | A1* | 10/2007 | Shim et al. | 349/64 |
| 2009/0002678 | A1 | 1/2009 | Tanaka et al. | |
| 2011/0139583 | A1* | 6/2011 | Bielenberg et al. | 198/604 |

FOREIGN PATENT DOCUMENTS

| | | |
|---|---|---|
| JP | 7-325154 | 12/1995 |
| JP | 9-274076 | 10/1997 |
| JP | 11-064518 | 3/1999 |
| JP | 2000-147124 | 5/2000 |
| JP | 3208702 | 9/2001 |
| JP | 2002-131431 | 5/2002 |
| JP | 2002-131434 | 5/2002 |
| JP | 3446466 | 9/2003 |
| JP | 2009-098111 | 5/2009 |

* cited by examiner $X = L \cdot \tan\theta$

OPTICAL BEAM SCANNER AND LASER RADAR UNIT

BACKGROUND OF THE INVENTION

1. Field of the Invention

The disclosures herein generally relate to an optical beam scanner and a laser radar unit.

2. Description of the Related Art

An object type determining apparatus is known that uses a scanning laser radar apparatus installed in a vehicle to detect preceding vehicles and obstacles on the road and/or lane markers such as white lines and cat's eyes. The laser radar apparatus may detect a preceding vehicle or an obstacle that is ahead of the vehicle by irradiating laser light in a forward direction ahead of the vehicle and receiving the laser light reflected by the preceding vehicle or obstacle.

FIG. 1 is a block diagram showing an exemplary configuration of a scanning laser radar apparatus. The scanning laser radar apparatus shown in FIG. 1 includes a light transmitting unit 910, a light receiving unit 920, and an ECU (electronic control unit) 930. The light transmitting unit 910 and the light receiving unit 920 are arranged at the front side of the vehicle so that objects located ahead of the vehicle may be detected.

The light transmitting unit 910 includes a semiconductor laser diode (referred to as "LD" hereinafter) 911 that irradiates pulsed laser light, an optical scanner 912, an input optical system 913 that guides the light from the LD 911 to the optical scanner 912, and an output optical system 914 that controls the tilt angle from the road surface of a light beam that has passed the optical scanner 912, for example. The LD 911 is connected to the ECU 930 via a LD drive circuit 915 and is configured to irradiate laser light according to an LD drive signal from the ECU 930. The optical scanner 912 is connected to the ECU 930 via an optical scanner drive circuit 916 and is configured to repetitively scan the light beam irradiated from the LD 911 in the horizontal direction at a predetermined frequency based on a light scanning drive signal from the ECU 930. The scanning angle of the light beam irradiated from the optical scanner 912 is detected by a scanning angle monitor 917 and is output to the ECU 930 as a scanning angle signal. By supplying the scanning angle signal as feedback for the light scanning drive signal, the scanning angle and the scanning frequency may be controlled.

The light receiving unit 920 includes a light receiving lens 921 and a light receiving element 922. Laser light reflected by an object located ahead of the vehicle enters the light receiving element 922 via the light receiving lens 921 and a mirror element (not shown), for example. The light receiving element 922 may be a photodiode, for example, and is configured to output an electric signal with a voltage corresponding to the intensity of the reflected light entering the light receiving element 922. The electric signal output by the light receiving element 922 is amplified by an amplifier 941 and output to a comparator 942. The comparator 942 compares the output voltage of the electric signal from the amplifier 941 with a reference voltage V0 and outputs a predetermined light receiving signal to a time measuring circuit 943 when the output voltage is greater than the reference voltage V0.

The time measuring circuit 943 also receives the LD drive signal that is output to the LD drive circuit 915 from the ECU 930 and outputs to the ECU 930 as time measurement data the time it takes for the predetermined light receiving signal to be generated after the LD drive signal is output; i.e., time difference between the time point at which the laser light is irradiated and the time point at which the reflected light is received. Based on the time measurement data, the ECU 930 may calculate the distance of the object from the laser radar apparatus.

In the above scanning laser radar apparatus, the optical scanner 912 of the light transmitting unit 910 may include a polygon mirror or a galvano mirror, for example. FIG. 2 is a diagram showing an exemplary configuration of the optical scanner 912 shown in FIG. 1. In FIG. 2, the LD 911 and the input optical system 913, which may be a collimator lens, for example, are arranged at the side of a scanning mirror 951 such as a polygon mirror. In this example, laser light irradiated from the LD 911 passes through the input optical system 913 to be reflected by a mirror 952 and irradiated on a mirror surface 951a of the scanning mirror 951. The scanning mirror 951 rotates around a rotational axis 951b, and since light irradiated on the mirror surface 951a of the scanning mirror 951 is reflected by the mirror surface 951a, a laser beam may be scanned over a wide range in the horizontal direction. In this way, distance measurement over a wide range may be possible.

Presently, there is an ongoing demand for techniques related to two-dimensional scanning that involves scanning a light beam in the vertical direction as well as the horizontal direction and multiple-line scanning that involves horizontally scanning multiple light beams having different measurement ranges in the vertical direction. To realize such two-dimensional scanning or multiple-line scanning, a structure is known that serially connects scanning devices such as mirrors having scanning angles that vary by 90 degrees to scan a light beam in the vertical direction right after scanning a light beam in the horizontal direction. Also, a structure is known for facilitating multiple-line scanning by inclining the reflection surfaces of a rotating polygon mirror with respect to the optical axis and varying the inclining angles of the reflecting surfaces.

For example, Japanese Laid-Open Patent No. 9-274076 discloses a laser radar apparatus that uses a polygon mirror with varying plane-inclining angles. To reduce the difference in the vertical measuring ranges at the right and left ends of a measuring area, the disclosed apparatus has a laser diode arranged at the rear upper part of the polygon mirror. The disclosed apparatus also has a mirror arranged in front of the polygon mirror so that a laser beam irradiated from the laser diode may enter the mirror surface of the polygon mirror from the front side.

Japanese Laid-Open Patent No. 2009-98111 discloses a structure including deflecting units such as mirrors arranged under a light emitting element so that light may be irradiated 360 degrees in all directions.

However, the conventional multi-beam scanning method using a rotating polygon mirror with inclining planes may cause the vertical irradiation angle (also referred to as "vertical irradiation angle" or "vertical output angle") to change as the horizontal scanning angle (also referred to as "horizontal irradiation angle" or "horizontal output angle") widens. That is, when a light beam from a LD enters a mirror surface face-to-face, the light beam is reflected at a vertical output angle that is twice a predetermined inclining angle. However, as the polygon mirror rotates, the light beam may enter the mirror surface at a narrower angle with respect to the mirror surface. In this case, an adequate irradiation angle in the vertical direction cannot be secured. Considering the overall measuring area to be measured using multiple scanning beams, when the horizontal scanning range is relatively wide such that horizontal scanning may be performed over a total scanning angle exceeding 60 degrees, for example, the vertical measuring range may be limited as the horizontal scanning angle increases so that an adequate measuring range cannot be secured.

The laser radar apparatus disclosed in Japanese Laid-Open Patent No. 9-274076 cannot effectively prevent beam distortions when scanning is performed over a wide angle. Also, since the LD is arranged at the upper part of the polygon mirror, miniaturization of the unit, particularly, the reduction of the unit thickness may be difficult.

Further, in the above laser radar apparatus, light irradiated from the LD may be scanned but the light receiving unit is not scanned so that the detection range may be limited, and if attempts are made to widen the detection range, the detection sensitivity may be degraded.

The laser radar apparatus disclosed in Japanese Laid-Open Patent No. 2009-98111 has the light emitting element arranged above the deflection units such as mirrors so that the length of the apparatus may not be reduced and miniaturization of the apparatus may be difficult.

It is noted that measures may be taken to reduce the length of the apparatus by arranging the light beam to enter the mirror from the side in a horizontal direction with respect to the mirror. However, when the light beam is arranged to enter a rotating mirror from a horizontal direction, the scanning light beam may be distorted and the measuring area may be deformed into a trapezoid shape, for example, so that measurements cannot be made on the desired measuring area.

SUMMARY OF THE INVENTION

It is a general object of at least one embodiment of the present invention to provide an optical beam scanner that substantially obviates one or more problems caused by the limitations and disadvantages of the related art.

One object of the present invention is to provide an optical beam scanner for scanning multiple lines that is configured to reduce variations in the vertical output angle of a light beam even when the horizontal output angle of the light beam is wide to thereby secure an adequate measuring range and reduce distortions in the measuring range. Another object of the present invention is to provide a laser radar unit that can be reduced in size and is capable of scanning plural beams with differing vertical output angles using an optical beam scanner according to an embodiment of the present invention. Another object of the present invention is to provide a laser radar unit that can be reduced in size and is capable of scanning a desired measuring area.

An optical beam scanner according to an embodiment of the present invention includes a light source, an optical scanner configured to scan a light beam irradiated from the light source, and an input optical system configured to direct the light beam irradiated from the light source to the optical scanner, wherein the optical scanner includes a rotating mirror configured to rotate around a rotational axis and reflect the light beam irradiated from the light source; the rotating mirror is rotated around the rotational axis so that the light beam is irradiated on differing positions of a mirror surface of the rotating mirror; and the mirror surface of the rotating mirror has a mirror surface inclining angle with respect to a direction parallel to the rotational axis, the mirror surface inclining angle being arranged to gradually increase from a first side to a second side of the rotating mirror in a direction parallel to a plane perpendicular to the rotational axis.

In one preferred embodiment of the present invention, on the plane perpendicular to the rotational axis, a first incident angle to the mirror surface of the light beam that is irradiated on the mirror surface at the first side of the rotational mirror is greater than a second incident angle to the mirror surface of the light beam that is irradiated on the mirror surface at the second side of the rotational mirror.

In another preferred embodiment of the present invention, the light beam is irradiated on the mirror surface so that an optical axis of the light beam is positioned away from the rotational axis by a distance of at least 0.8 times a rotation radius of the rotational mirror and no more than 1.0 times the rotation radius.

In another preferred embodiment of the present invention, the mirror surface includes a first region in which the mirror surface inclining angle gradually increases in the direction parallel to the plane perpendicular to the rotational axis, and a second region in which the mirror surface inclining angle is substantially the same.

In another preferred embodiment of the present invention, the mirror surface includes two differing regions in which the mirror surface inclining angle gradually increases in the direction parallel to the plane perpendicular to the rotational axis; and the two differing regions are connected by a point at which the gradual increase in the mirror surface inclining angle becomes discontinuous.

In another preferred embodiment of the present invention, the length of the mirror surface in the direction parallel to the plane perpendicular to the rotational axis is at least 5 W and no more than 12 W, where W represents the width of the light beam in the direction parallel to the plane perpendicular to the rotational axis.

In another preferred embodiment of the present invention, the length of the mirror surface in the direction parallel to the plane perpendicular to the rotational axis is at least two times the rotation radius of the rotational mirror.

In another preferred embodiment of the present invention, plural rotating mirrors are arranged to have differing mirror surface inclining angles with respect to a direction parallel to the rotational axis.

In another preferred embodiment of the present invention, the light source includes an edge emitting laser diode, and a substrate surface of the edge emitting laser diode is arranged to be substantially parallel to the rotational axis.

A laser radar unit according to an embodiment of the present invention includes an optical beam scanner according to an embodiment of the present invention and a light receiving unit configured to receive light reflected by an object that is irradiated by the light beam irradiated from the optical beam scanner, wherein the optical scanner includes a rotating mirror configured to rotate around a rotational axis and reflect the light beam irradiated from the light source; the rotating mirror is rotated around the rotational axis so that the light beam is irradiated on different positions of a mirror surface of the rotating mirror; and the mirror surface of the rotating mirror has a mirror surface inclining angle with respect to a direction parallel to the rotational axis, the mirror surface inclining angle being arranged to gradually increase from a first side to a second side of the rotating mirror in a direction parallel to a plane perpendicular to the rotational axis.

A laser radar unit according to another embodiment of the present invention includes a light emitting unit, a light scanning unit configured to scan a light beam irradiated from the light emitting unit, and a light receiving unit configured to receive light reflected by an object that is irradiated by the light beam irradiated from the light scanning unit, wherein the light scanning unit includes a light reflecting unit configured to reflect the light beam irradiated from the light source and a rotating unit configured to rotate the reflecting unit around a rotational axis, the light beam being scanned by rotating the rotating unit; the light reflected by the object is reflected by the light reflecting unit of the light scanning unit and irradiated on the light receiving unit; and an inclining angle of the light reflecting unit is adjusted according to a rotation angle of the light reflecting unit.

In one preferred embodiment of the present invention, an oscillation angle corresponding to the inclining angle of the light reflecting unit with respect to the rotational axis is adjusted according to the rotation angle of the light reflecting unit so that $90°-\cos^{-1}(\sin 2\theta \cos \phi)$ equals a predetermined value, where $\theta$ represents the oscillation angle of the light reflecting unit and $\phi$ represents the rotation angle of the light reflecting unit.

In another preferred embodiment, a laser radar unit according to the present invention may include a base part having a cam groove, the rotation unit being arranged on the base part so that the rotational axis is perpendicular to a surface of the base part; and a connection portion configured to connect the light reflecting unit to the rotational axis; wherein a first edge portion of the light reflecting unit is connected to the connection portion by a connection axis that is arranged in a perpendicular direction with respect to the rotational axis so that the light reflecting unit rotates around the connection axis; the connection portion is connected to the rotational axis; a second edge portion of the light reflecting unit includes a contact portion that is inserted into the cam groove of the base part; and the contact portion moves along the cam groove when the light reflecting unit is rotated.

In another preferred embodiment of the present invention, a spring member is arranged between the light reflecting unit and the rotational axis of the rotating unit.

In another preferred embodiment, a laser radar unit according to the present invention includes a base part on which the rotation unit is arranged so that the rotational axis is perpendicular to a surface of the base part; a connection portion configured to connect the light reflecting unit to the rotational axis; and an actuator configured to control the inclining angle of the light reflecting unit; wherein a first edge portion of the light reflecting unit is connected to the connection portion by a connection axis that is arranged in a perpendicular direction with respect to the rotational axis so that the light reflecting unit rotates around the connection axis; the connection portion is connected to the rotational axis; and the actuator adjusts the inclining angle of the light reflecting unit.

In another preferred embodiment, a laser radar unit according to the present invention includes a control unit configured to control the actuator so that a vertical output angle of irradiated light with respect to a plane perpendicular to the rotational axis is a predetermined angle when the light beam is scanned.

In another preferred embodiment of the present invention, an oscillation amount of the light reflecting unit corresponding to distance components in a perpendicular direction with respect to the rotational axis from the connection axis to a second edge portion of the light reflecting unit is adjusted to equal $L \cdot \tan(1/2 \cdot \sin^{-1}(\cos(90-\phi)/\cos \phi))$, where $\phi$ represents the rotation angle of the light reflecting unit, $\phi$ represents a vertical output angle corresponding to an angle with respect to a plane perpendicular to the rotational axis of irradiated light that is reflected and irradiated by the light reflecting unit, and L represents distance components in a parallel direction with respect to the rotational axis from the connection axis to the second edge portion of the light reflecting unit.

In another preferred embodiment, the optical scanning unit includes plural light reflecting units having differing inclining angles with respect to the rotational axis.

In another preferred embodiment, a first optical axis of the light beam that is irradiated from the light emitting unit towards the optical scanning unit includes a first optical axis portion right before entering the optical scanning unit, a second optical axis of the light reflected by the optical scanning unit to be detected by the light receiving unit includes a second optical axis portion right after passing the optical scanning unit, and the first optical axis portion and the second optical axis portion are arranged to be coplanar.

According to an aspect of the present invention, variations in the vertical output angle of a light beam may be reduced even when the horizontal output angle of the light beam is wide so that an adequate measurement range may be secured and distortions in the measurement range may be reduced in an optical beam scanner for scanning multiple lines. In another aspect of the present invention, a laser radar unit is provide that is reduced in size and is capable of scanning multiple beams having differing vertical output angles using an optical beam scanner according to an embodiment of the present invention. In another aspect of the present invention, a laser radar unit is provided that is reduced in size and is capable of scanning a desired measuring area.

BRIEF DESCRIPTION OF THE DRAWINGS

Other objects and further features of embodiments will be apparent from the following detailed description when read in conjunction with the accompanying drawings, in which.

DESCRIPTION OF THE PREFERRED EMBODIMENTS

Figure 1:
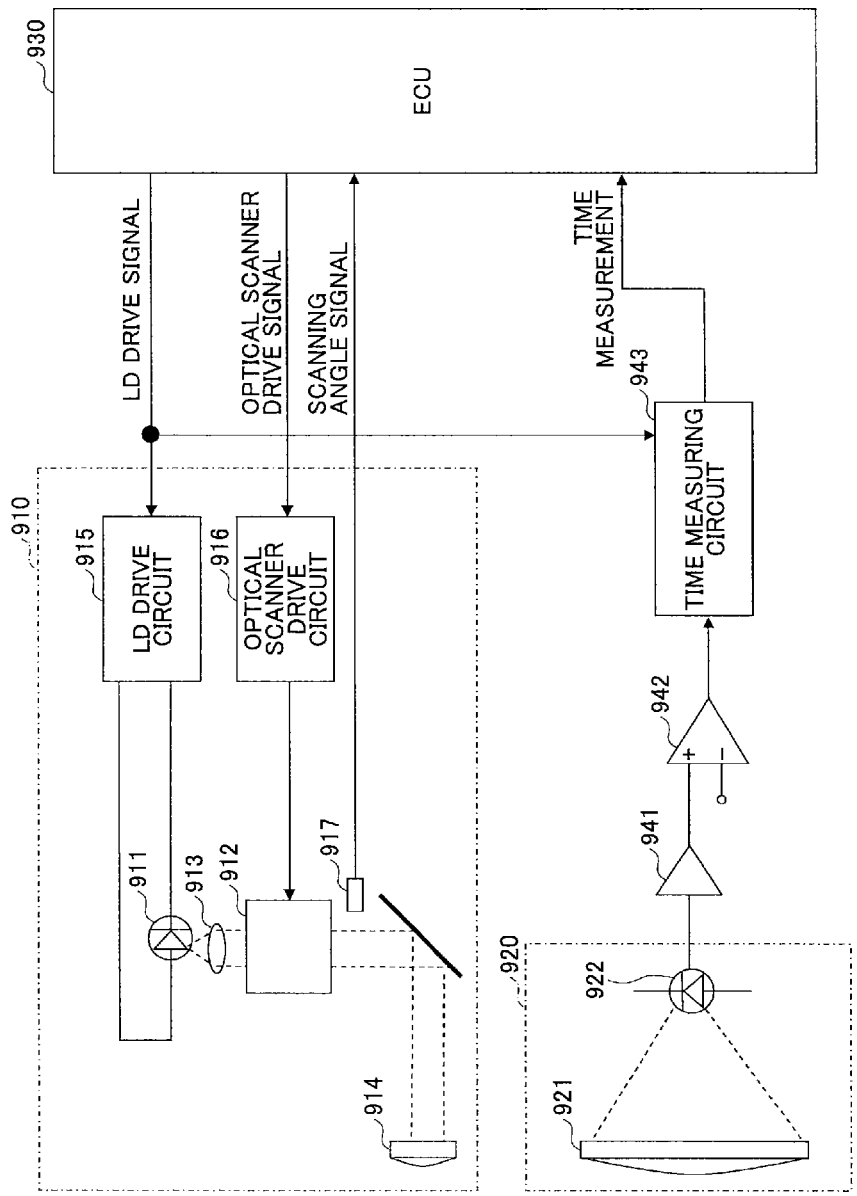
FIG. 1 is a block diagram showing an exemplary configuration of a scanning laser radar apparatus.
Figure 2:
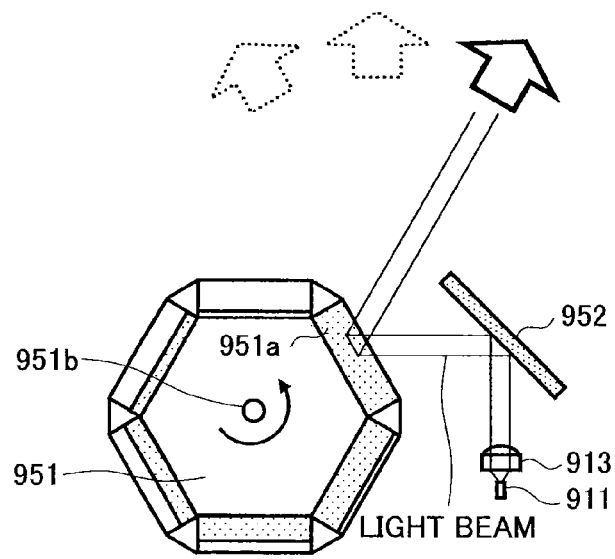
FIG. 2 is a diagram showing an exemplary configuration of an optical scanner shown in FIG. 1.

In the following, embodiments of the present invention are described with reference to the accompanying drawings. It is noted that in the following descriptions, identical features and components are given the same reference numerals and their descriptions may be omitted.

First Embodiment

In the following, the occurrence of distortions in the measuring area upon performing multiple-beam scanning using a plane-inclining mirror is described with reference to FIGS. 3-6.

Figure 3:
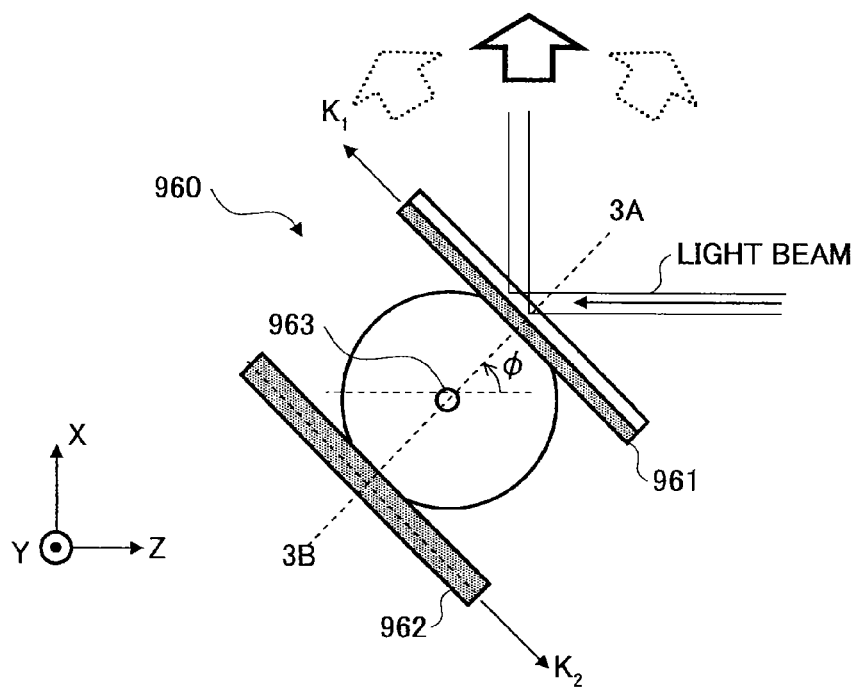
FIG. 3 is a top view of an optical beam scanner.
Figure 4:
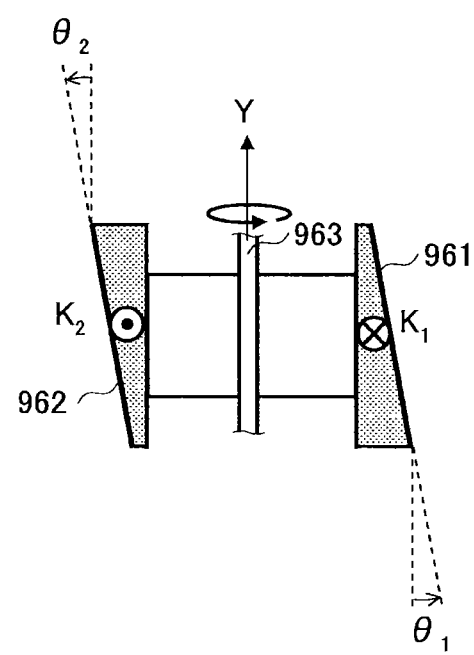
FIG. 4 is a cross-sectional view of the optical beam shown in FIG. 3.

FIG. 3 is a top view of an exemplary optical beam scanner, and FIG. 4 is a cross-sectional view of the optical beam scanner from section 3A-3B shown in FIG. 3.

The optical beam scanner shown in FIG. 3 includes a rotating polygon mirror 960 rotating around a rotational axis 963 and having two mirror surfaces 961, 962. The optical beam scanner scans a light beam by irradiating the light beam from a side of the rotating polygon mirror 960. As is shown in FIG. 4, the two mirror surfaces 961, 962 have differing inclining angles. That is, the mirror surface 961 tilts at a mirror surface inclining angle $\theta_1$ with respect to the rotational axis 963 to face slightly upward in FIG. 4. The mirror surface 962 tilts at a mirror surface inclining angle $\theta_2$ with respect to the rotational axis 963 to face slightly downward in FIG. 4. It is noted that in the illustrated example, an orthogonal coordinate system is defined by a direction parallel to the rotational axis 963 corresponding to the Y-axis, and the center of the measuring area corresponding to the X-axis. Also, a case in which the optical axis of the light beam is parallel to the Z-axis is illustrated in the present example. However, the optical axis of the light beam may be anywhere on the XZ plane that is perpendicular to the Y-axis. In FIG. 3, $K_1$ represents an axis that is parallel to the mirror surface 961 and $K_2$ represents an axis that is parallel to the mirror surface 962. Also, in FIG. 3, $\phi$ represents the rotation angle of the mirror surfaces 961, 962 around the rotational axis 963 with respect to the Z-axis. Accordingly, when $\theta$=45 degrees, the light reflected by the mirror surfaces 961, 962 will be irradiated in a direction parallel to the X-axis.

Generally, a ray matrix of a light beam reflected by a planar mirror may be represented by Formula 1 shown below, where (L, M, N) represents the direction cosine vector of the incident ray, (l, m, n) represents the direction cosine vector of a normal line of the mirror surface, and $(L_1, M_1, N_1)$ represents the direction cosine vector of the reflected ray.

$$\begin{pmatrix} L_1 \\ M_1 \\ N_1 \end{pmatrix} = \begin{pmatrix} a_1 & b_1 & c_1 \\ b_1 & a_2 & b_2 \\ c_1 & b_2 & a_3 \end{pmatrix} \begin{pmatrix} L \\ M \\ N \end{pmatrix}$$ [Formula 1]

$a_1 = 1 - 2l^2, \quad b_1 = 2lm, \quad c_1 = -2ln$ $a_2 = 1 - 2m^2, \quad b_2 = -2mn$ $a_3 = 1 - 2n^2$ Formula 2 shown below reflects the configuration of the optical beam scanner of FIG. 3 by setting the direction cosine vector of the incident ray of Formula 1 at (0, 0, −1).

$$\begin{pmatrix} L_1 \\ M_1 \\ N_1 \end{pmatrix} = \begin{pmatrix} a_1 & b_1 & c_1 \\ b_1 & a_2 & b_2 \\ c_1 & b_2 & a_3 \end{pmatrix} \begin{pmatrix} 0 \\ 0 \\ -1 \end{pmatrix} = \begin{pmatrix} -c_1 \\ -b_2 \\ -a_3 \end{pmatrix} = \begin{pmatrix} 2ln \\ 2mn \\ -(1-2n^2) \end{pmatrix}$$ [Formula 2]

Assuming θ denotes the generalized inclining angle of the mirror surfaces 961, 962, and φ denotes the rotation angle of the mirror surfaces 961, 962, the direction cosine of the normal line of the mirror surface (l, m, n) may be represented by Formula 3 shown below.

$l = \cos\theta \sin\phi$ $m = \sin\theta$ $n = \cos\theta \cos\phi$ [Formula 3]

Based on Formulas 2 and 3, the direction cosine of the reflected ray may be represented by Formula 4 shown below.

$$\begin{pmatrix} L_1 \\ M_1 \\ N_1 \end{pmatrix} = \begin{pmatrix} \cos^2\theta \sin 2\phi \\ \sin 2\theta \cos\phi \\ -(1 - 2\cos^2\theta \cos^2\phi) \end{pmatrix}$$ [Formula 4]

Based on the direction cosine components of the reflected ray obtained from Formula 4, the horizontal output angle of the mirror surface may be represented by Formula 5 shown below, and the vertical output angle of the mirror surface may be represented by Formula 6 shown below.

Horizontal Output Angle = [Formula 5]

$\tan^{-1}\left(\dfrac{L_1}{N_1}\right) = \tan^{-1}\left(\dfrac{\cos^2\theta \sin 2\phi}{1 - 2\cos^2\theta \cos^2\phi}\right)$ Horizontal Output Angle=$90° - \cos^{-1}(M_1) = 90° - \cos^{-1}$ (sin 2θ cos φ) [Formula 6]

Figure 5:
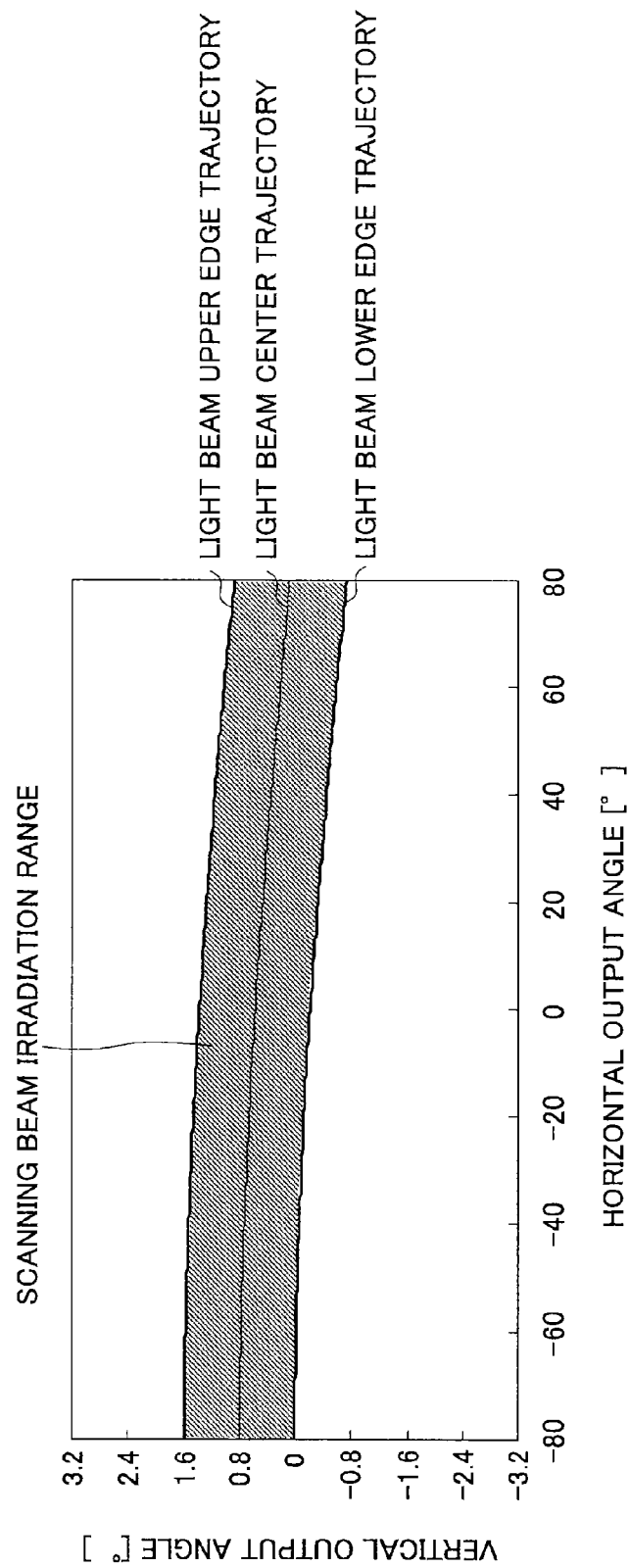
FIG. 5 is a graph showing the relationship between the horizontal output angle and the vertical output angle of the optical beam scanner in a case where one mirror is used.

FIG. 5 is a graph showing the relationship between the horizontal output angle and the vertical output angle based on Formulas 5 and 6 in a case where one mirror surface is used. It is noted that FIG. 5 illustrates a case where the mirror surface inclining angle is 0.4 degrees and the vertical beam spread angle is 1.6 degrees. The horizontal output angle is arranged to be 0 degrees (i.e., 0 degrees in the X-axis direction in FIG. 3) when the mirror rotation angle φ is 45 degrees. In FIG. 5, scanning is performed at a horizontal output angle range from −80 to 80 degrees with respect to the X-axis direction. As is shown in FIG. 5, when the horizontal output angle is small, the vertical output angle of the light beam center is close to 0.8 degrees, which is equal to twice the mirror surface inclining angle. However, as the horizontal output angle increases, the vertical output angle decreases. That is, when the horizontal output angle is small, the mirror rotation angle φ is small and the light beam is irradiated at an angle almost perpendicular to the mirror surface, whereas when the mirror rotation angle φ is greater, the light beam is irradiated at a smaller angle almost parallel to the mirror surface. When the light beam is scanned, the light beam spreads over ±0.8 degrees with respect to the optical beam center. When the horizontal output angle is small, the vertical output angle is within a range of approximately 0 to +1.6 degrees. However, as the horizontal output angle increases, the vertical output angle decreases and ultimately reaches close to a range from −0.8 to +0.8 degrees, which is the vertical output angle range when the mirror surface inclining angle θ is close to 0 degrees. Thus, when one mirror surface is used, the vertical output angle decreases as the horizontal output angle increases.

Figure 6:
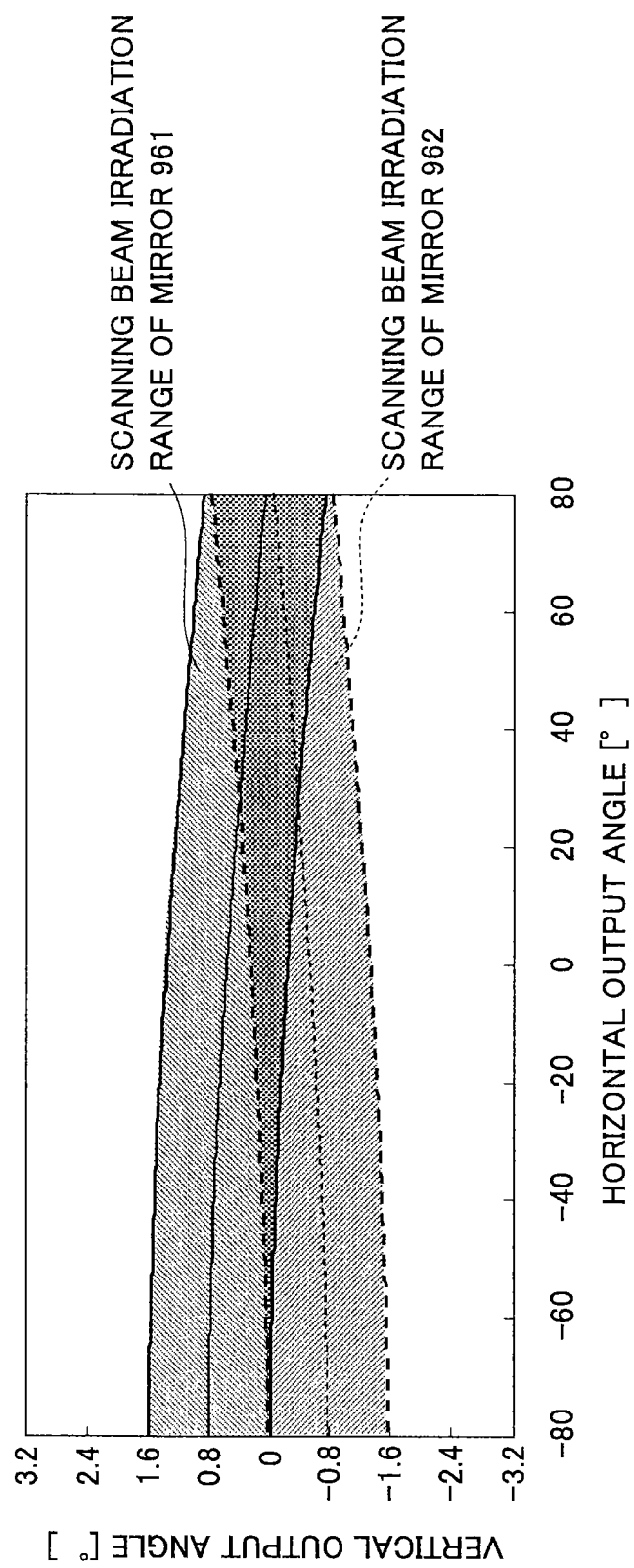
FIG. 6 is a graph showing the relationship between the horizontal output angle and the vertical output angle of the optical beam scanner in a case where two mirrors are used.

FIG. 6 is a graph showing the relationship between the horizontal output angle and the vertical output angle in a case where the mirror surfaces 961, 962 shown in FIGS. 3 and 4 are used, where the inclining angle $\theta_1$ of the mirror surface 961 is set at 0.4 degrees and the inclining angle $\theta_2$ of the mirror surface 962 is set at −0.4 degrees, and two light beams are scanned. It is noted that the horizontal output angle and the vertical output angle of the light beam scanned by the mirror surface 961 may be identical to the scanning results shown in FIG. 5. As for the relationship between the horizontal output angle and the vertical output angle of the light beam scanned by the mirror surface 962, when the horizontal output angle is small, the vertical output angle is approximately −1.6 to 0 degrees. As the horizontal output angle increases, the vertical output angle increases and ultimately comes close to a range from −0.8 to +0.8 degrees, which is the vertical scanning range when the mirror surface inclining angle θ is 0 degrees (i.e., when the mirror surface 962 has no mirror surface inclining angle).

As can be appreciated from the above, in the case of using two light beams, when the horizontal output angle is small, the vertical output angle is approximately −1.6 to +1.6 degrees. However, as the horizontal output angle increases, the vertical output angle becomes narrower and comes close to a range from −0.8 to +0.8 degrees. That is, in the case of using the optical beam scanner as shown in FIGS. 3 and 4, the vertical output angle range becomes narrower as the horizontal output angle increases.

(Optical Beam Scanner)

In the following, an optical beam scanner according to a first embodiment of the present invention is described.

Figure 7:
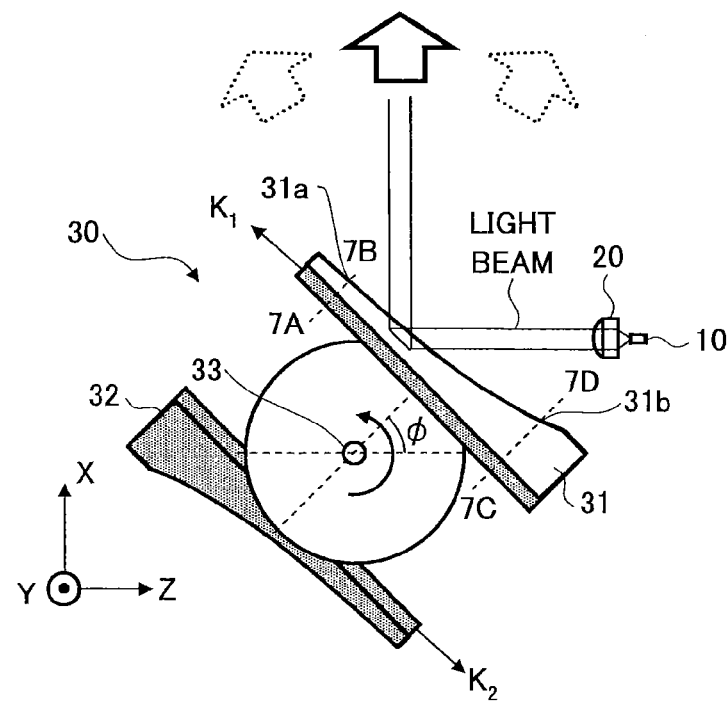
FIG. 7 is a top view of an optical beam scanner according to a first embodiment of the present invention.
Figure 8A:
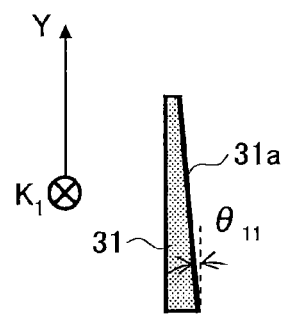
FIGS. 8A and 8B are cross-sectional views of the optical beam scanner according to the first embodiment of the present invention.
Figure 8B:
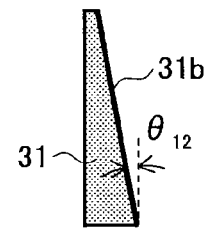

FIGS. 7, 8A, and 8B are diagrams showing an optical beam scanner according to the first embodiment of the present invention. FIG. 7 is a top view, FIG. 8A is a cross-sectional view from section 7A-7B shown in FIG. 7, and FIG. 8B is a cross-sectional view from section 7C-7D shown in FIG. 7 of the optical beam scanner according to the present embodiment.

The optical beam scanner according to the present embodiment includes a laser diode as a light source 10, a collimator lens as an input optical system 20, and an optical scanner 30. The optical scanner 30 is a rotating polygon mirror that includes two mirrors 31, 32, and is configured to rotate around a rotational axis 33 and scan a light beam that is irradiated on its side. In the illustrated example, an orthogonal coordinates system is defined by the rotational axis 33 of the polygon mirror of the optical scanner 30 as the Y-axis direction, and the center of the measuring range as the X-axis direction. Also, a case in which the optical axis of the light beam is arranged to be parallel to the Z-axis is illustrated in the present example. Further, an axis that is perpendicular to the Y-axis and parallel to the mirror 31 is referred to as the $K_1$-axis, and an axis that is perpendicular to the Y-axis and parallel to the mirror 32 is referred to as the $K_2$-axis. It is noted that φ denotes the rotation angle of the mirrors 31, 32 rotating around the rotational axis 33, and when φ=45 degrees, light reflected by the mirrors 31, 32 is irradiated in a direction parallel to the X-axis.

In the present embodiment, a laser diode that irradiates a pulsed light is used as the light source 10. However, the present invention is not limited to this embodiment, and for example, a diode that irradiates non-coherent light may be used, or a light source that does not irradiate pulsed light may be used as well.

The collimator lens as the input optical system 20 converts light irradiated from the light source 10 into a light beam having a predetermined beam diameter and a predetermined beam spread angle and irradiates the light beam to the polygon mirror corresponding to the optical scanner 30. In one embodiment, to accommodate a case in which the light source 10 may be arranged at any given position and irradiate light in any given direction, for example, the input optical system 20 may also include an optical path converting element (not shown) that is configured to control the direction of the light beam irradiated from the light source 10 and guide the light beam from the polygon mirror side.

In the present embodiment, the mirror 31 of the polygon mirror corresponding to the optical scanner 30 is arranged so that the mirror surface inclining angle θ with respect to the rotational axis 33 gradually changes in the K1-axis direction corresponding to the longitudinal direction of the mirror 31. As is shown in FIG. 8A, at mirror surface 31a where light from the light source 10 enters the mirror 31 at an angle closer to a perpendicular angle, the mirror surface inclining angle $θ_{11}$ is a relatively small angle. As is shown in FIG. 8B, at mirror surface 31b where light from the light source 10 enters the mirror 31 at a narrower angle, the mirror surface inclining angle $θ_{12}$ is a relatively large angle. That is, the mirror 31 is arranged to have a mirror surface inclining angle θ that gradually increases from the side where the mirror surface 31a is arranged to the other side where the mirror surface 31b is arranged. Thus, the mirror surface inclining angle θ of the mirror 31 between the dotted lines 7A-7B and 7C-7D shown in FIG. 7 is arranged so that $θ_{11} \le θ \le θ_{12}$.

Based on Formula 6, to maintain the vertical output angle at a fixed angle, the value of sin 2θ cos φ may be fixed. Thus, in the present embodiment, the mirror 31 is arranged to have the mirror surface inclining angle θ vary according to the mirror rotation angle φ so that even when the mirror rotation angle φ varies and the horizontal output angle varies, the vertical output angle may be fixed. That is, in the present embodiment, the vertical output angle does not substantially change even when the horizontal output angle is changed.

In one aspect of the present invention, the positional change of the light beam incident on the mirror surface of the polygon mirror when the polygon mirror is rotated may be taken into consideration. For example, in FIG. 7, assuming positions on the mirror surface of the mirror 31 may be represented by coordinates of the $K_1$-axis perpendicular to the Y-axis, the coordinate of the intersection point of the light beam incident on the mirror surface of the mirror 31 changes as the mirror 31 is rotated. In the present embodiment, the mirror 31 is arranged to have the mirror surface inclining angle θ vary according to the mirror rotation angle φ so that sin 2θ cos φ equals a predetermined value at each of the intersection point coordinates.

In the following, the intersection point coordinate of the light beam incident on the mirror surface of the mirror 31 is described in detail.

Figure 9:
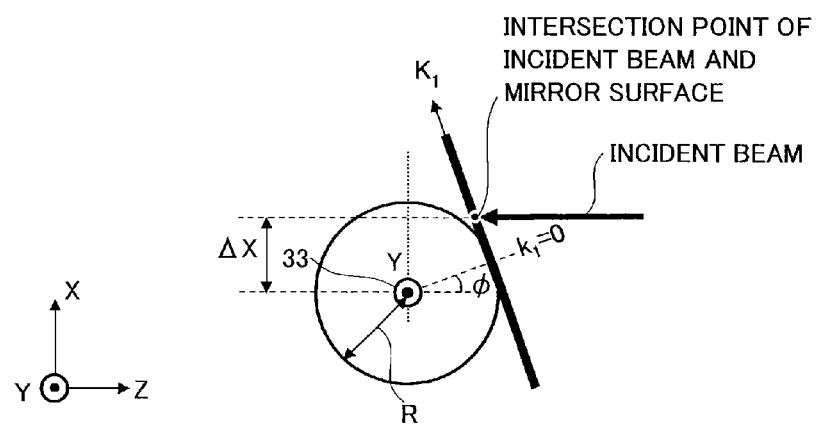
FIG. 9 is a diagram showing an offset and an intersection point of an incident beam and a mirror surface of the optical beam scanner according to the first embodiment.

FIG. 9 is a diagram showing an intersection point of an incident beam and the mirror surface of the mirror 31 at rotational angle φ. In FIG. 9, the origin of the $K_1$-axis is at the intersection point of the Z-axis and the $K_1$-axis when the mirror rotation angle φ is 0 degrees, R represents a mirror rotation radius corresponding to the distance from the rotational axis 33 to the origin of the $K_1$-axis, and ΔX represents an offset corresponding to the distance in the X-axis direction from the rotational axis 33 to the incident beam. Formula 7 shown below represents the intersection point coordinate $K_1(φ)$ in relation to the offset ΔX and the mirror rotation radius R in the case where the intersection point of the incident light beam and the mirror surface of the mirror 31 is represented by a coordinate on the $K_1$-axis.

$$k_1(\phi) = \frac{\Delta X}{\cos\phi} - R\tan\phi \qquad \text{[Formula 7]}$$

As can be appreciated from Formula 7, the intersection point coordinate $K_1(φ)$ varies depending on the mirror rotation angle φ and the offset ΔX.

Figure 10:
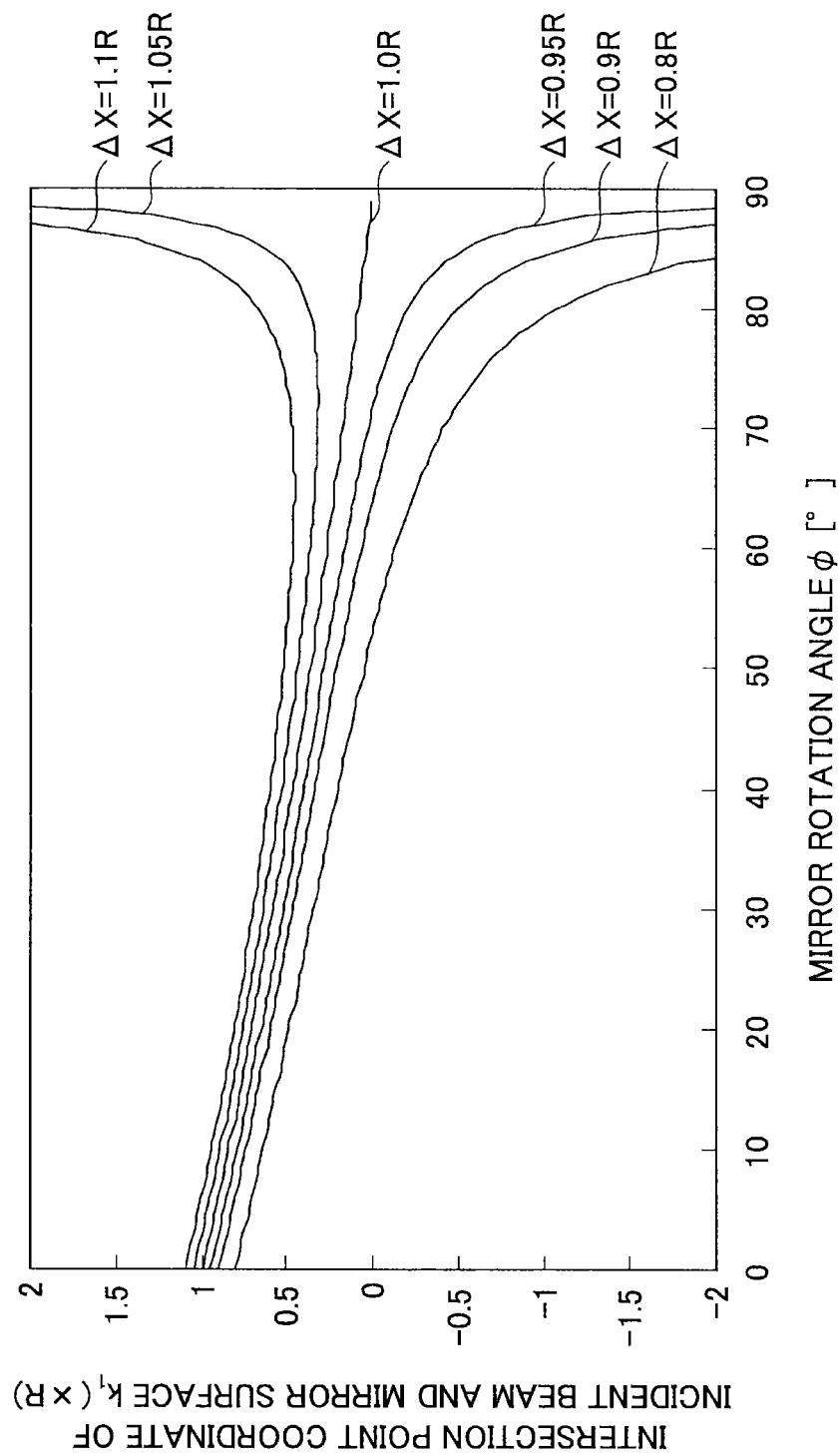
FIG. 10 is a graph showing the relationship between the mirror rotation angle and the intersection point coordinate of the optical beam scanner according to the first embodiment.

FIG. 10 is a graph showing the relationship between the mirror rotation angle φ and the intersection point coordinate $K_1(φ)$, where the horizontal axis represents the mirror rotation angle φ, the vertical axis represents the intersection point coordinate $K_1(φ)$ normalized by the mirror rotation radius R. As is shown in FIG. 10, when the offset ΔX is greater than the mirror rotation radius R, the same point on the mirror surface is incident at two different mirror rotation angles φ. For example, when ΔX=1.1 R, a light beam is incident on the mirror surface at the same coordinate $K_1$=0.5 R both when the mirror rotation angle φ is 53 degrees and when the mirror rotation angle φ is 73 degrees. In this case, when attempts are made to increase the mirror rotation angle φ to scan the light beam over a wider range, it may be difficult to adjust the mirror surface inclining angle θ to obtain a predetermined vertical output angle according to the mirror rotation angle φ. Thus, to scan a light beam over a wide range in the horizontal direction, the offset ΔX is preferably arranged to be no more than the mirror rotation radius R. On the other hand, if the value of the offset ΔX is too small relative to the mirror rotation radius R, the intersection point coordinate $K_1$ may become too small when the mirror rotation angle φ is widened so that the overall length of the mirror may have to be increased. For example, in the case where the mirror rotation angle φ is 85 degrees in FIG. 10, the intersection point coordinate $K_1$ may be at least −2 R if the offset ΔX is arranged to be at least 0.8 R.

Based on the above, the offset ΔX is preferably arranged to be within the following range: 0.8 R≤ΔX≤1.0 R, and more preferably within the following range: 0.95 R≤ΔX≤1.0 R.

In the following, the mirror surface inclining angle is described.

Figure 11:
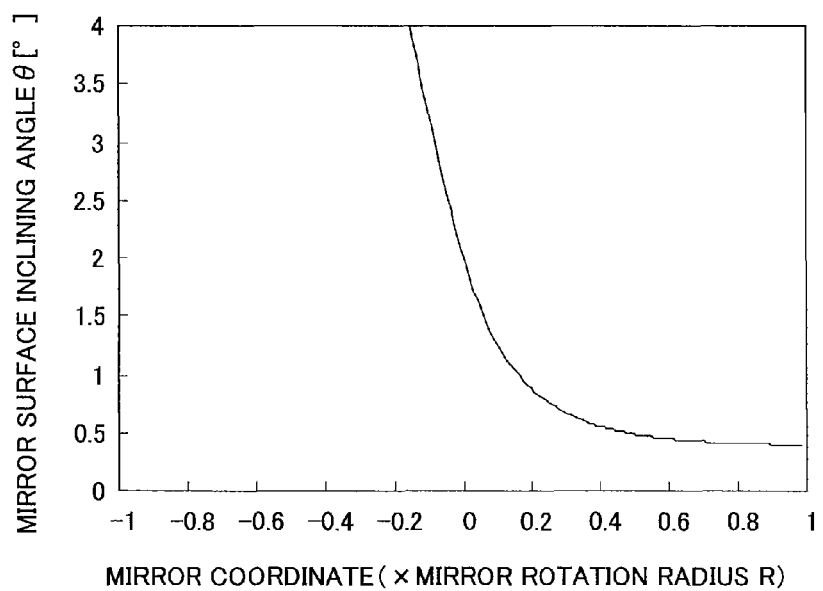
FIG. 11 is a graph showing the mirror surface inclining of the optical beam scanner according to the first embodiment.

FIG. 11 is a graph showing the relationship between the mirror surface inclining angle θ and the mirror coordinate of the mirror 31, where the offset ΔX is 0.98 R and the vertical output angle is 0.8 degrees. The mirror coordinates that are represented by the horizontal axis in FIG. 11 correspond to in-plane coordinates of the mirror 31 normalized by the mirror rotation radius R. The coordinate of a light beam incident on the mirror 31 may be obtained from Formula 7 based on the mirror rotation angle $\phi$ and the predetermined offset $\Delta X$. The mirror surface inclining angle $\theta$ for obtaining a desired vertical output angle at this coordinate may be determined based on Formula 6. Further, the horizontal output angle in this case may be obtained from Formula 5. By repeating the above calculations using the mirror rotation angle $\phi$ as a parameter, the relationship between the mirror coordinate and the mirror surface inclining angle $\theta$ of the mirror 31 as shown in FIG. 11 may be obtained.

Figure 12:
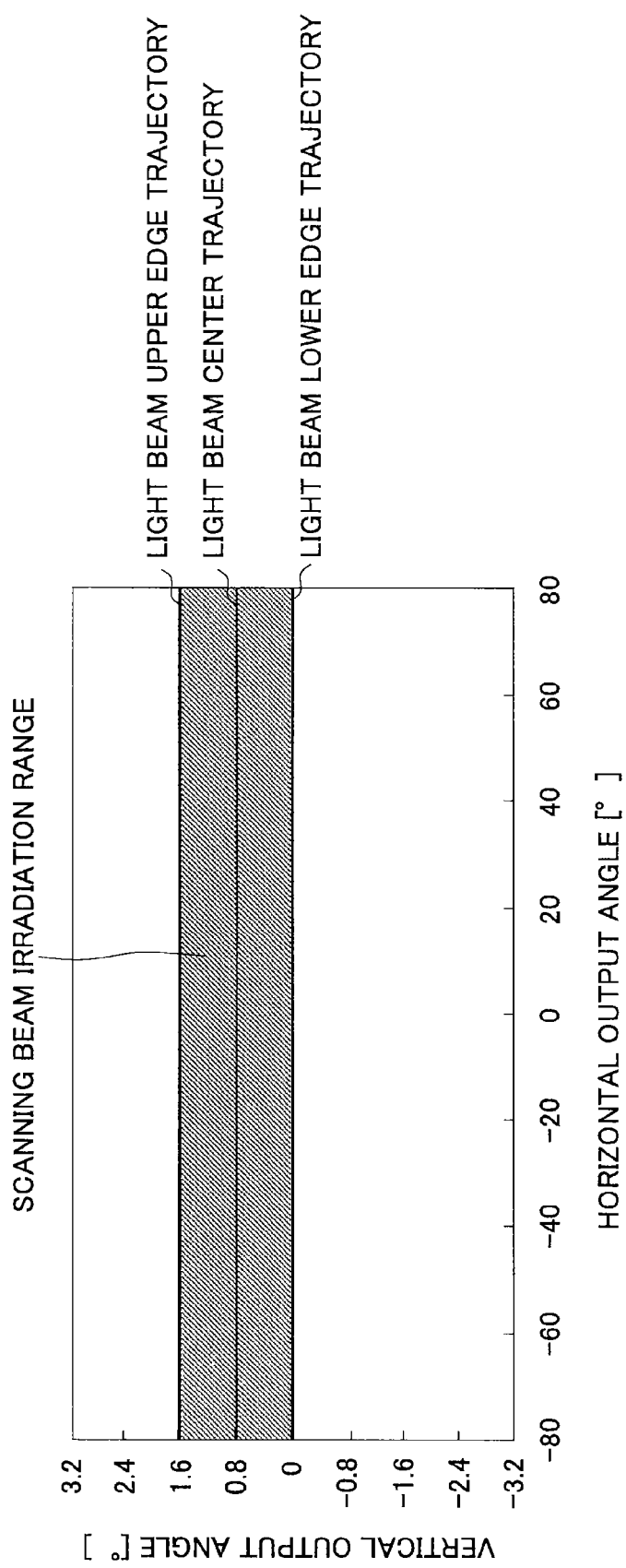
FIG. 12 is a graph showing the relationship between the horizontal output angle and the vertical output angle of the optical beam scanner according to the first embodiment in the case where one mirror is used.
Figure 13:
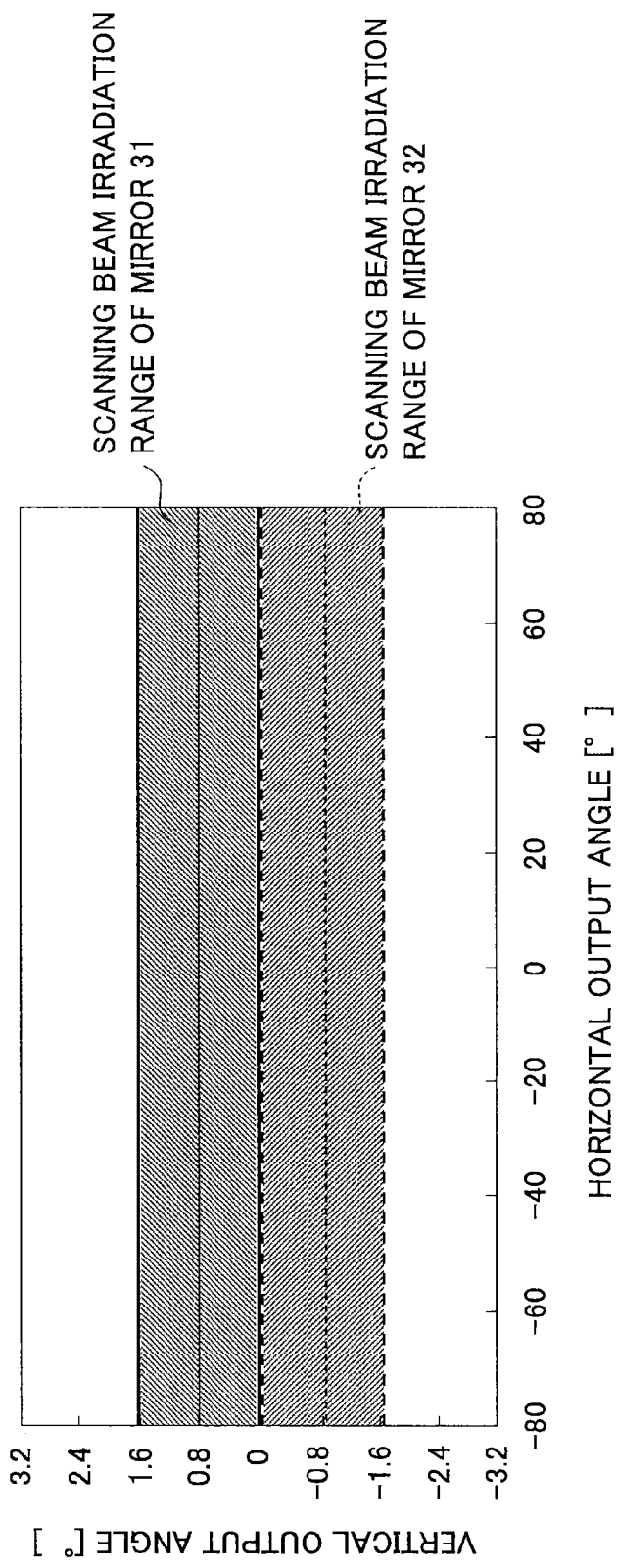
FIG. 13 is a graph showing the relationship between the horizontal output angle and the vertical output angle of the optical beam scanner according to the first embodiment in the case where two mirrors are used.

FIG. 12 is a graph showing the relationship between the horizontal output angle and the vertical output angle of the mirror 31 having a mirror surface inclining angle $\theta$ that changes as illustrated in FIG. 11. In FIG. 12, it is assumed that the light beam is an optimal beam that does not have a width in the horizontal direction and spreads in the vertical direction at a spread angle of 1.6 degrees. In this case, the vertical output angle does not depend on the horizontal output angle and remains constant at 0.8 degrees. FIG. 13 is a graph showing the relationship between the horizontal output angle and the vertical output angle in a case where a light beam is scanned by a polygon mirror with two mirrors 31 and 32. It is noted that FIG. 13 illustrates a case where the mirror surface inclining angle $\theta$ of each of the mirrors 31 and 32 is calculated and arranged so that the vertical output angle of the mirror 31 is +0.8 degrees, the vertical output angle of the mirror 32 is −0.8 degrees. In this case, even when the horizontal output angle changes, the vertical output angle does not substantially change and a measuring range from −1.6 to +1.6 degrees is constantly maintained.

It is noted that the above examples represent cases in which the light beam does not have a width in the horizontal direction. However, in reality, the light beam has a width in the horizontal direction as well as the vertical direction.

Figure 14:
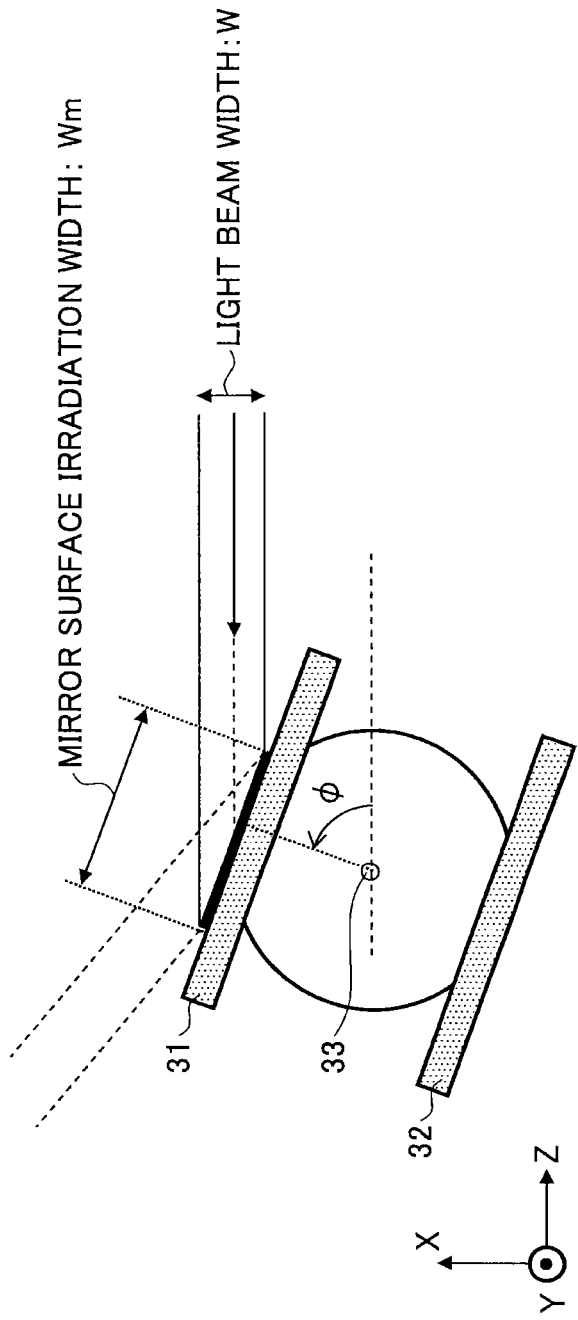
FIG. 14 is a diagram showing the mirror surface irradiation width of the optical beam scanner according to the first embodiment in a case where an incident light beam has a certain width in the horizontal direction.

FIG. 14 is a diagram showing a light beam having a width W in the horizontal direction that is incident on the mirror 31. When such a light beam is incident on the mirror 31, the light beam may irradiate the mirror surface of the mirror 31 over a mirror surface irradiation width Wm. When the light beam is incident on the mirror 31 at a substantially perpendicular angle with respect to the mirror surface, the mirror irradiation width may be substantially equal to the light beam width W. However, as the mirror rotation angle $\phi$ increases and the light beam enters the mirror 31 at a narrower angle with respect to the mirror surface, the mirror surface irradiation width Wm increases according to the mirror rotation angle $\phi$. Formula 8 shown below represents the mirror irradiation width Wm in relation to the mirror rotation angle $\phi$ and the light beam width W.

$$W_m(\phi) = \frac{W}{\cos\phi} \quad \text{[Formula 8]}$$

Figure 15:
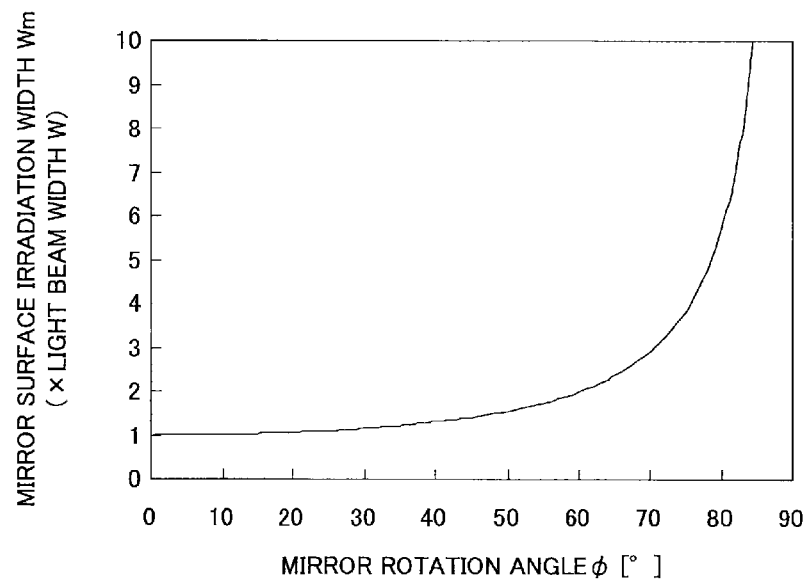
FIG. 15 is a graph showing the relationship between the mirror rotation angle and the mirror surface irradiation width of the optical beam scanner according to the first embodiment.

FIG. 15 is a graph showing the relationship between the mirror rotation angle $\phi$ and the mirror surface irradiation width Wm, where the vertical axis represents the mirror surface irradiation width Wm normalized by the light beam width W. According to FIG. 15, when the mirror rotation angle $\phi$ is 80 degrees, for example, the mirror irradiation width Wm will be 5.8 times the light beam width W. Thus, in one preferred embodiment, the mirror surface irradiation width Wm may be taken into consideration in designing the optical beam scanner, and the overall length of the mirror; i.e., the length of the mirror surface of the mirror 31 in the XZ plane may be adjusted accordingly.

For example, in the case of scanning a light beam using a polygon mirror having two mirrors 31 and 32 as is shown in FIG. 14, if the optical beam scanner is to scan light over a wide range such as a total angle of 140 degrees in the horizontal direction, the mirror rotation angle may rotate around a 70-degree rotation range from 10 degrees to 80 degrees, for example. In this case, taking into consideration the mirror surface irradiation width Wm when the mirror rotation angle $\phi$ is relatively wide, the overall length of the mirror 31 is preferably arranged to be at least 5 times the light beam width W, more preferably at least 6 times the light beam width W. The horizontal beam diameter of a light beam used in a laser radar apparatus is generally around 1-10 mm. For example, in the case where the horizontal beam diameter is 5 mm, the overall length of the mirror 31 is preferably arranged to be at least 30 mm. On the other hand, when the length of the mirror 31 exceeds the mirror rotation diameter, namely 2 R, the overall size of the optical beam scanner may be too large. In one preferred embodiment, the optical beam scanner may be arranged to accommodate a mirror rotation angle $\phi$ of up to 85 degrees. That is, based on Formula 8, the overall length of the mirror 31 may be arranged to be about 12 times the light beam width W so that the mirror surface irradiation width Wm may not exceed the overall length of the mirror 31 even when the mirror rotation angle $\phi$ is 85 degrees. Thus, the overall length of the mirror 31 (i.e., the length of the mirror 31 in the $K_1$-axis direction) is preferably arranged to be at least 5 times the light beam width W in the Y-axis direction and no more than 12 times the light beam diameter W.

Figure 16:
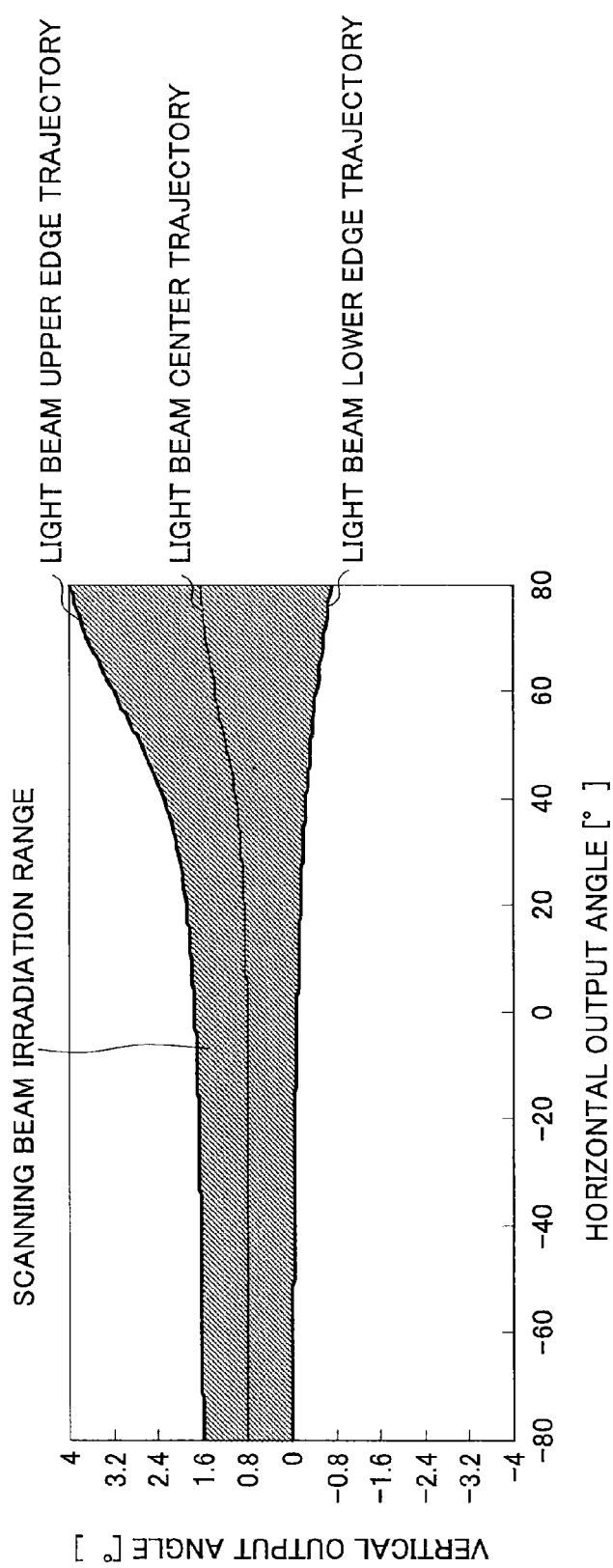
FIG. 16 is a graph showing the relationship between the horizontal output angle and the vertical output angle of the optical beam scanner according to the first embodiment in the case where one mirror is used and the width of the incident light beam is taken into consideration.

FIG. 16 is a graph showing the relationship between the horizontal output angle and the vertical output angle of the mirror 31 in the case where the light beam incident on the mirror 31 has a light beam width W in the horizontal direction. In FIG. 16, it is assumed that the light beam width W in the horizontal direction is $\frac{1}{16}$ of the mirror rotation radius R. As the horizontal output angle increases, that is, as the mirror rotation angle $\phi$ increases, the irradiation range of the vertical output angle increases. That is, the mirror 31 is irradiated by a light beam with a predetermined light beam width W at differing mirror coordinates at differing mirror surface inclining angles $\theta$ as is shown in FIG. 11 so that when the light beam is irradiated on a region corresponding to a small mirror surface inclining angle $\theta$, the vertical output angle may be small, whereas when the light beam is irradiated on a region corresponding to a large mirror surface inclining angle $\theta$, the vertical output angle may be large. As the mirror rotation angle $\phi$ increases, the mirror surface irradiation width Wm increases and the irradiation range of the vertical output angle increases as well.

Figure 17:
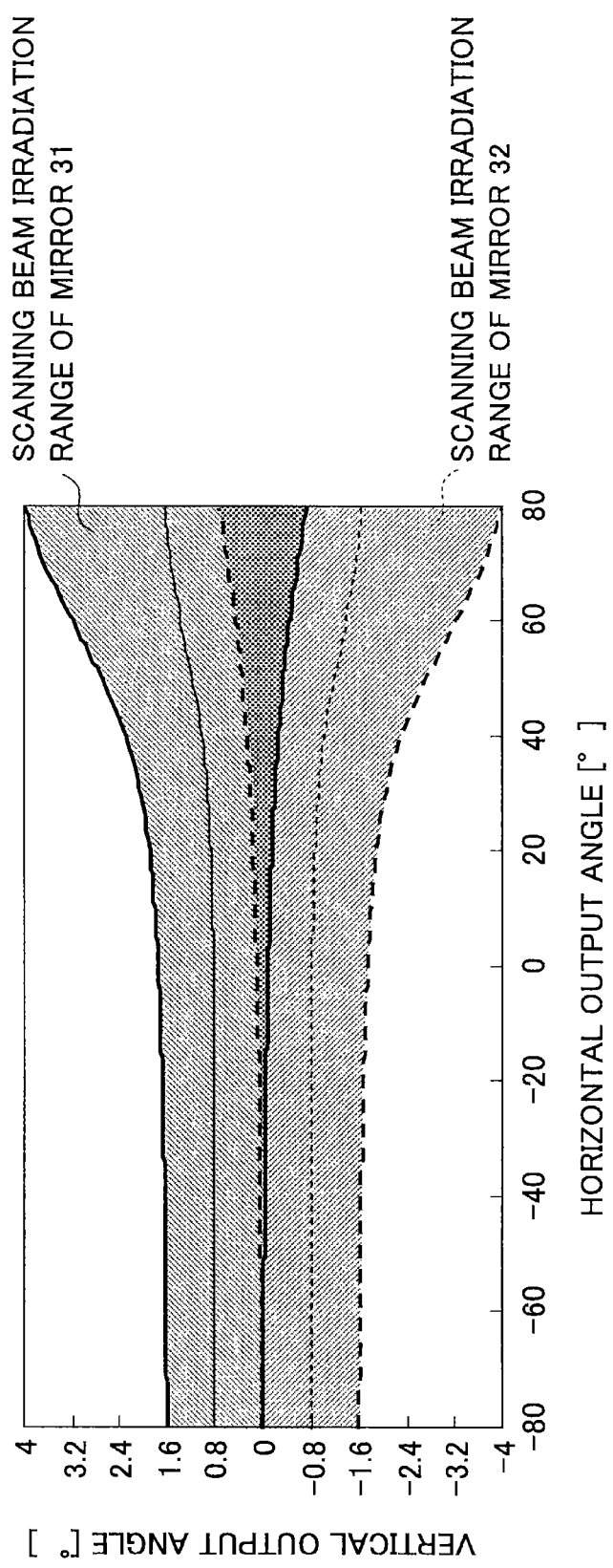
FIG. 17 is a graph showing the relationship between the horizontal output angle and the vertical output angle of the optical beam scanner according to the first embodiment in the case where two mirrors are used and the width of the incident light beam is taken into consideration.

FIG. 17 is a graph showing the relationship between the horizontal output angle and the vertical output angle of the optical beam scanner when a polygon mirror having two mirrors 31, 32 is used and the light beam width W in the horizontal direction is taken into consideration. In FIG. 17, the mirror surface inclining angle $\theta$ of each of the mirrors 31 and 32 is calculated and arranged so that the vertical output angle of the mirror 31 is +0.8 degrees, and the vertical output angle of the mirror 32 is −0.8 degrees. As can be appreciated, as the horizontal output angle increases, the vertical output angle irradiation range becomes wider. However, since the irradiation range does not become narrower, the desired irradiation range may be obtained.

Second Embodiment

In the following, a second embodiment of the present invention is described. In an optical beam scanner according to the present embodiment, variations in the vertical output angle that occur in connection with variations in the horizontal output angle may be reduced. It is noted that the configuration of the optical beam scanner according to the present embodiment may be identical to that shown in FIG. 7. In the present embodiment, the mirror is arranged to have a mirror surface inclining angle δ as shown in FIG. 18.

Figure 18:
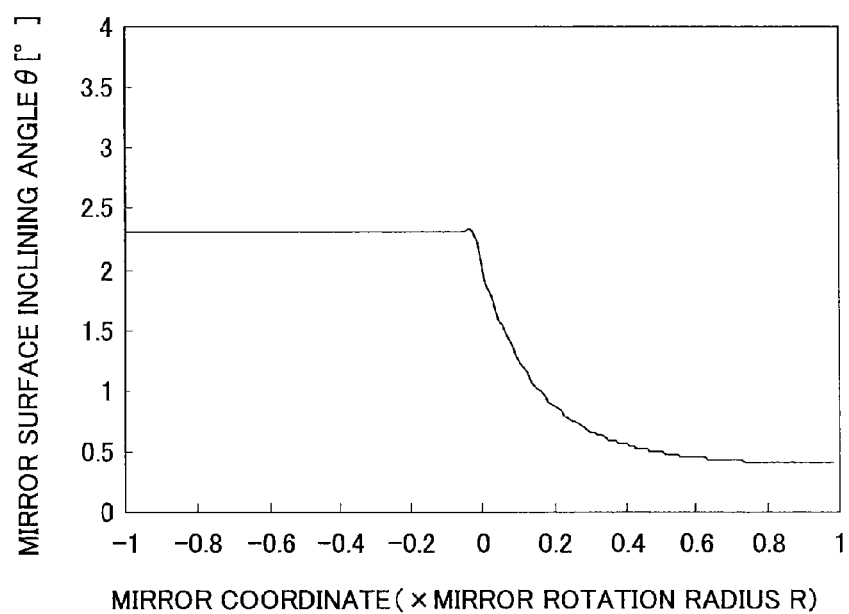
FIG. 18 is a graph showing the mirror surface inclining angle of an optical beam scanner according to a second embodiment of the present invention.

FIG. 18 is a graph showing the relationship between the mirror coordinate and the mirror surface inclining angle θ of the mirror 31 in the optical beam scanner according to the present embodiment. In the present embodiment, the mirror surface inclining angle θ gradually increases as the mirror coordinate decreases in a manner similar to the first embodiment as is shown in FIG. 11 up to the point where the mirror coordinate is around zero (0). However, the mirror surface inclining angle θ is arranged to be substantially the same in the region where the mirror coordinate is less than zero (0).

As is shown in FIG. 10, when the offset ΔX is at least 0.8 R and the mirror rotation angle φ is no more than 70 degrees, the intersection point coordinate $K_1$ when a light beam is incident on the mirror is at least −0.5 R. Particularly, when the offset ΔX is 1.0 R, the intersection point coordinate $K_1$ of the incident light beam and the mirror surface is limited to being a positive value. In this case, the center of the light beam is not irradiated on the region where the mirror coordinate is a negative value. Although a mirror surface needs to be arranged in the region where the mirror coordinate is negative since the light beam actually has a certain beam width, in the case of accommodating for the optimal light beam with no width in the horizontal direction and arranging the mirror surface inclining angle θ so that the vertical output angle may be substantially fixed when such a light beam is incident on the mirror surface as in the example of FIG. 11, the mirror surface inclining angle θ abruptly increases at the region where the mirror coordinate is negative. In the case where the light beam has a predetermined beam width, the edges of the beam may be irradiated on mirror coordinate regions corresponding to a greater mirror surface inclining angle θ so that the light reflected by the mirror 31 may be output at an output angle that is greater than the desired vertical output angle. Accordingly, the vertical direction spread angle of the light beam increases. However, as is shown in FIG. 10, the center of the light beam is not irradiated on a region where the mirror coordinate is less than a certain value. Thus, the mirror surface inclining angle θ may be arranged to be a predetermined value within this region so that excessive spreading of the light beam in the vertical direction may be prevented. It is noted that in FIG. 18, the region where the mirror coordinate is less than a certain value may correspond to the region where the mirror coordinate is less than zero (0).

Figure 19:
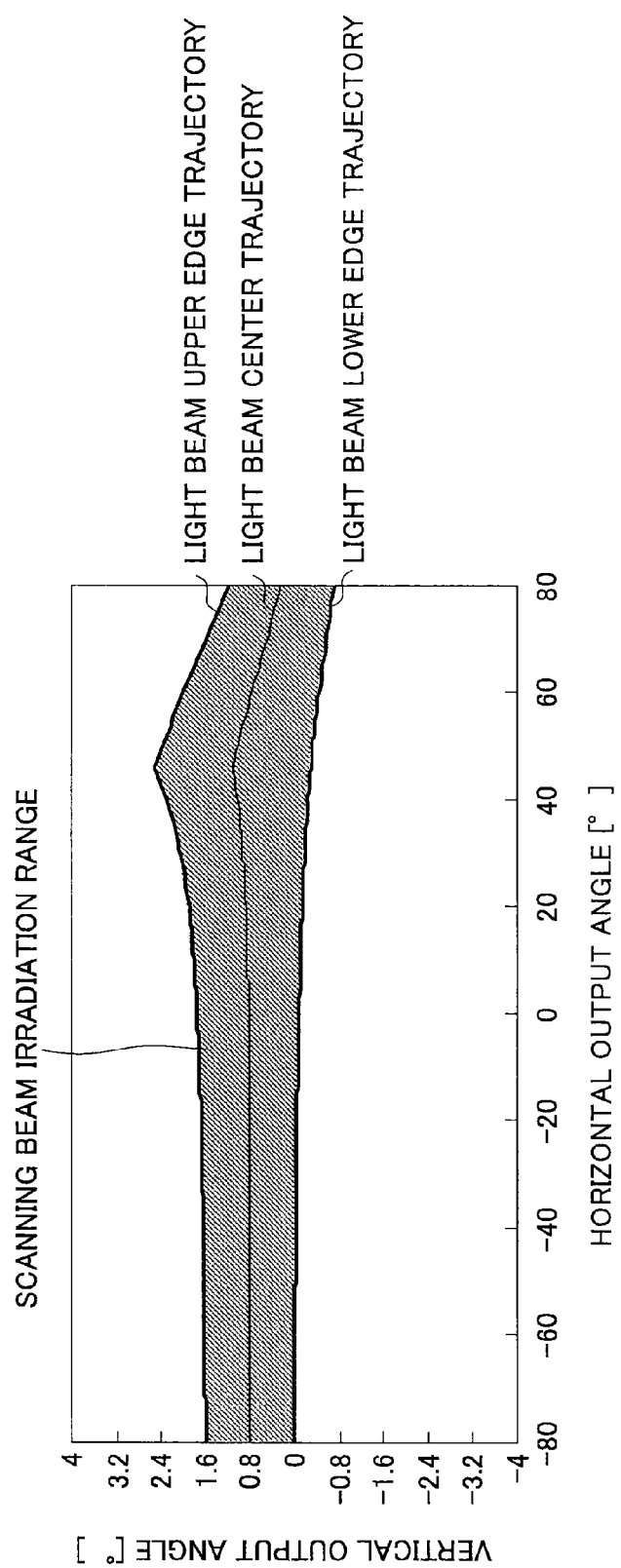
FIG. 19 is a graph showing the relationship between the horizontal output angle and the vertical output angle of the optical beam scanner according to the second embodiment in the case where one mirror is used.

FIG. 19 is a graph showing the relationship between the horizontal output angle and the vertical output angle of the mirror 31 in the present embodiment. As is shown in FIG. 19, in the present embodiment, the vertical output angle may be maintained substantially the same even when the horizontal output angle is changed.

Figure 20:
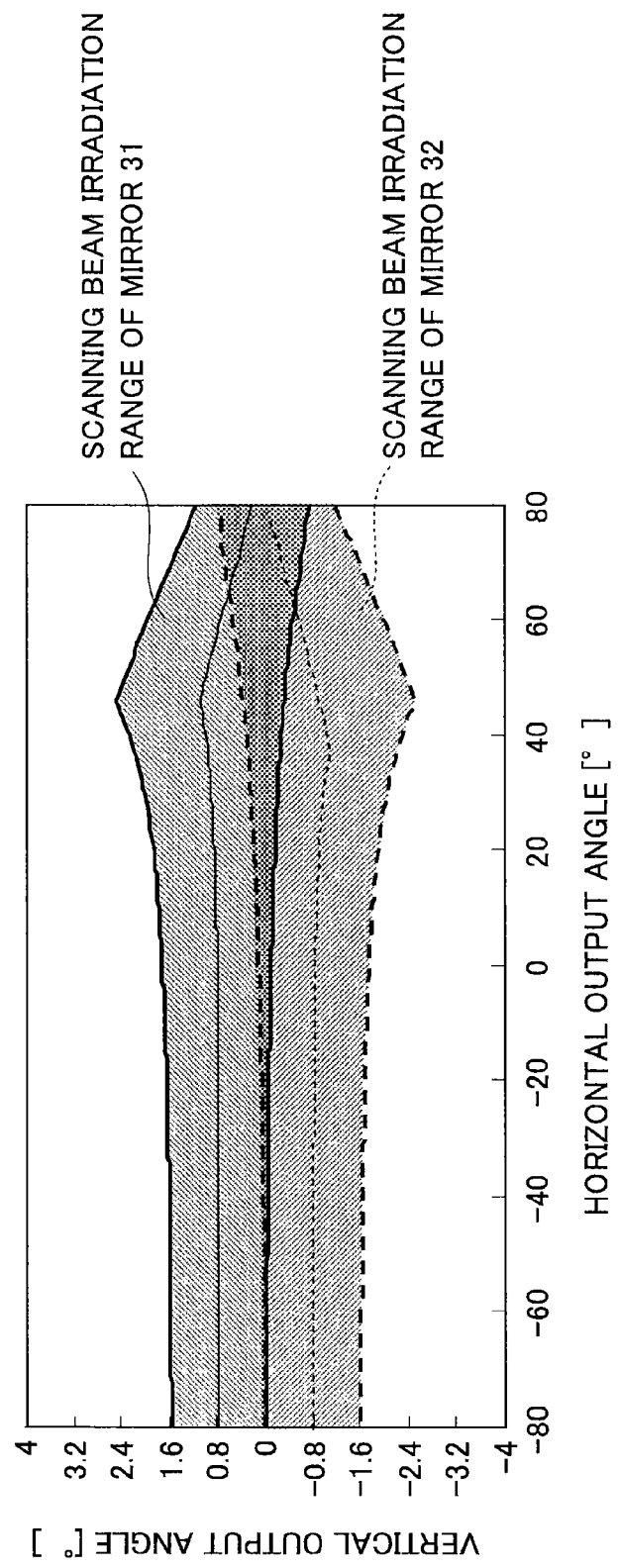
FIG. 20 is a graph showing the relationship between the horizontal output angle and the vertical output angle of the optical beam scanner according to the second embodiment in the case where two mirrors are used and the width of the incident light beam is taken into consideration.

FIG. 20 is a graph showing the relationship between the horizontal output angle and the vertical output angle in the case where a light beam is scanned by a polygon mirror having two mirrors 31, 32, and the light beam width W in the horizontal direction is taken into consideration. In FIG. 20, the mirror surface inclining angle θ of each of the mirrors 31 and 32 is calculated and arranged so that the vertical output angle of the mirror 31 is +0.8 degrees, and the vertical output angle of the mirror 32 is −0.8 degrees. As can be appreciated, when the horizontal output angle is around 45 degrees, the vertical output angle that has been increasing up to this point starts decreasing. However, the irradiation range of the vertical output angle does not substantially change even when the horizontal output angle is further increased from this point. That is, in the present embodiment, the irradiation range does not widen as the horizontal output angle increases but remains substantially the same. In this way, the irradiation range is prevented from becoming narrower so that a desired irradiation range may be obtained. It is noted that other features of the second embodiment that are not described above may be identical to the first embodiment.

Third Embodiment

In the following, a third embodiment of the present invention is described. In an optical beam scanner according to the present embodiment, variations in the vertical output angle that occur in connection with variations in the horizontal output angle may be reduced. It is noted that the configuration of the optical beam scanner according to the present embodiment may be identical to that shown in FIG. 7. In the present embodiment, the mirror is arranged to have a mirror surface inclining angle θ as shown in FIG. 21.

Figure 21:
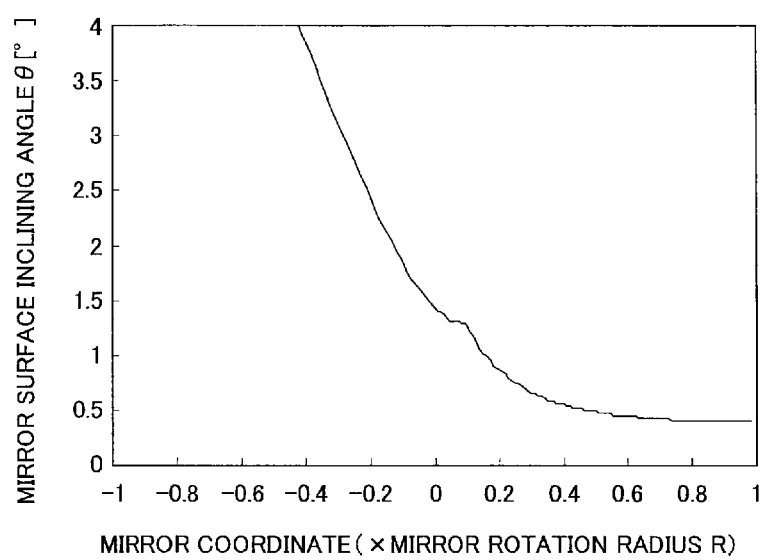
FIG. 21 is a graph showing the mirror surface inclining angle of an optical beam scanner according to a third embodiment of the present invention.

FIG. 21 is a graph showing the relationship between the mirror coordinate and the mirror surface inclining angle θ of the mirror 31 in the optical beam scanner according to the present embodiment. In FIG. 21, the relationship between the mirror coordinate and the mirror surface inclining angle θ when the mirror coordinate is at least 0.1 R may be defined by a curve in which the surface inclining angle θ gradually increases as the mirror coordinate decreases in a manner similar to the first embodiment shown in FIG. 11. In the region where the mirror coordinate is less than 0.1 R, the relationship between the mirror coordinate and the mirror surface inclining angle θ may be defined by a different curve.

In the present embodiment, the mirror surface inclining angle θ is arranged to vary little in the region where the mirror coordinate is around 1 R, and the mirror surface inclining angle θ is arranged to gradually increase as the mirror coordinate decreases up to the point where the mirror coordinate is 0.1 R. In the region where the mirror coordinate is less than 0.1 R, the mirror surface inclining angle θ is arranged to vary little where the mirror coordinate is around 0.1 R after which the variation in the mirror surface inclining angle θ becomes greater as the mirror coordinate decreases. In other words, in the present embodiment, the relationship between the mirror coordinate and the mirror surface inclining angle θ over the length of the mirror 31 may be defined by two different curves that are connected by an inflection point at the point where the mirror coordinate is 0.1 R.

Figure 22:
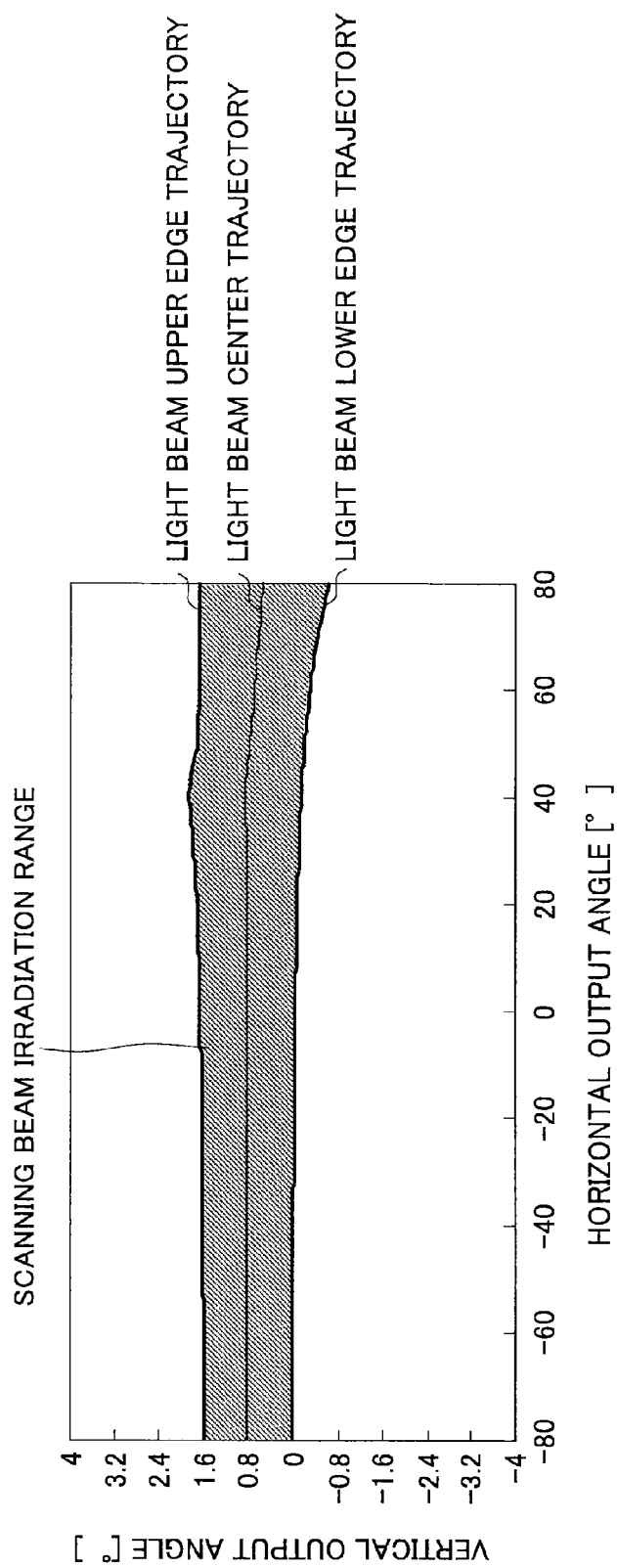
FIG. 22 is a graph showing the relationship between the horizontal output angle and the vertical output angle of the optical beam scanner according to the third embodiment in the case where one mirror is used.

FIG. 22 is a graph showing the relationship between the horizontal output angle and the vertical output angle of the mirror 31 in the present embodiment. As is shown in FIG. 22, in the present embodiment, the vertical output angle range remains substantially the same even when the horizontal output angle is +60 degrees or greater. Thus, even when the horizontal output angle changes, the vertical output angle may not substantially change so that a substantially fixed vertical irradiation range may be obtained.

Figure 23:
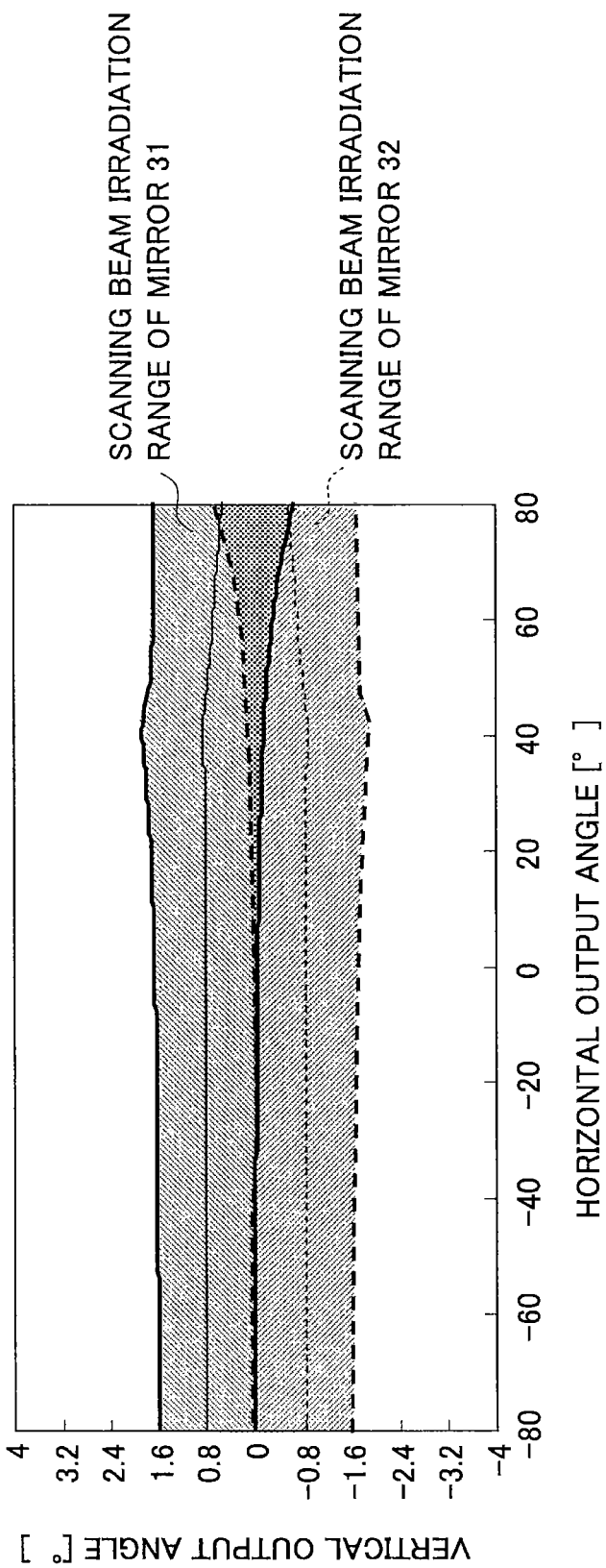
FIG. 23 is a graph showing the relationship between the horizontal output angle and the vertical output angle of the optical beam scanner according to the third embodiment in the case where two mirrors are used and the width of the incident light beam is taken into consideration.

FIG. 23 is a graph showing the relationship between the horizontal output angle and the vertical output angle in the case where a light beam is scanned by a polygon mirror having two mirrors 31, 32, and the light beam width in the horizontal direction is taken into consideration. In FIG. 23, the mirror surface inclining angle θ of each of the mirrors 31 and 32 is calculated and arranged so that the vertical output angle of the mirror 31 is +0.8 degrees, and the vertical output angle of the mirror 32 is −0.8 degrees. As can be appreciated, even when the horizontal output angle increases, the irradiation range of the vertical output angle does not substantially change and the vertical irradiation range does not widen. That is, in the present embodiment, the irradiation range may be prevented from becoming narrower so that a desired irradiation range may be obtained. It is noted that other features of the third embodiment that are not described above may be identical to the first embodiment.

Fourth Embodiment

In the following, a fourth embodiment of the present invention is described. In the present embodiment an edge emitting laser diode that is arranged at a predetermined location is used as the light source 10.

Figure 24:
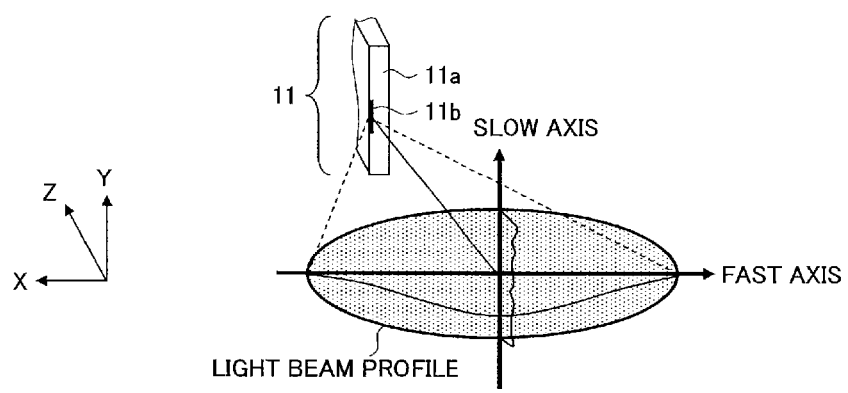
FIG. 24 is a diagram showing an edge emitting laser diode used in an optical beam scanner according to a fourth embodiment of the present invention.

FIG. 24 is a diagram showing the edge emitting laser diode 11 used in the present embodiment. The edge emitting laser diode 11 used as the light source 10 in the present embodiment includes a substrate 11a and a thin light emitting region 11b arranged on the surface of the substrate 11a. Since laser light is emitted from the light emitting region 11b, the spread angle of a light beam may be different depending on whether the spreading direction is in a parallel direction or a perpendicular direction with respect to the surface of the substrate 11a. In general, the spreading direction of the wider light beam spread angle; i.e., perpendicular direction with respect to the substrate 11a surface, is referred to as the fast axis direction, and the spreading direction of the narrower light beam spread angle; i.e., parallel direction with respect to the substrate 11a surface, is referred to as the slow axis direction. A light beam irradiated from the light emitting region 11b is arranged to have a light beam width of 1 μm and a spread angle of approximately 30 degrees in the fast axis direction. Since the width of the light emitting region 11b in the perpendicular direction with respect to the substrate 11a surface is relatively narrow, single mode oscillation is used in the fast axis direction. On the other hand, the width of the light emitting region 11b in the slow axis direction depends on the width of the active layer parallel to the substrate 11a surface. In the case where a high output laser diode is used, the width of the active layer may be increased to raise the light emitting intensity. The width of the active layer is generally arranged to be in the range of 40-400 μm. Since the width of the active layer in the slow axis direction is greater than the wavelength of the irradiated laser light, multi-mode oscillation is used in the slow axis direction. It is noted that the spread angle in the slow axis direction is approximately 10 degrees, and this spread angle does not substantially depend on the width of the active layer. Accordingly, in the present embodiment, laser light is irradiated by the edge emitting laser diode 11 in the fast axis direction through single-mode oscillation so that the beam profile is close to a Gaussian beam, and laser light is irradiated in the slow axis direction through multi-mode oscillation so that the beam profile cannot easily be represented by a specific function.

Considering a case where the light irradiated from the edge emitting laser diode 11 is turned into parallel light by the input optical system 20 such as a collimating lens, since single-mode oscillation is performed in the fast axis direction, parallel beams having a relationship between the beam width and the spread angle similar to that of the Gaussian beam may be created. On the other hand, since multi-mode oscillation is performed in the slow axis direction, it may be difficult to create completely parallel light and even after passing the light through the collimating lens, the light may be propagated as a light beam having some spread angle.

As can be appreciated from the above, in the case of using the edge emitting laser diode 11 as the light source 10, the optical beam scanner is preferably arranged such that the fast axis (i.e., perpendicular direction with respect to the substrate 11a surface) corresponds to the light beam scanning direction (horizontal direction) of the optical beam scanner. In this way, the angular resolution in the horizontal direction may be improved. It is noted that in this case, the substrate 11a surface and the rotational axis 33 are preferably arranged to be substantially parallel. In this case, since the light beam still spreads in the slow axis direction at a certain spread angle even after the light beam passes though a collimating lens, the vertical output angle may be determined by this spread angle in the slow axis direction. It is noted that the present embodiment may be applied to the first through third embodiments of the present invention.

Fifth Embodiment

In the following, a laser radar unit according to a fifth embodiment of the present invention is described with reference to FIGS. 25 and 26. It is noted that the laser radar unit according to the present embodiment includes an optical beam scanner according to an embodiment of the present invention.

Figure 25:
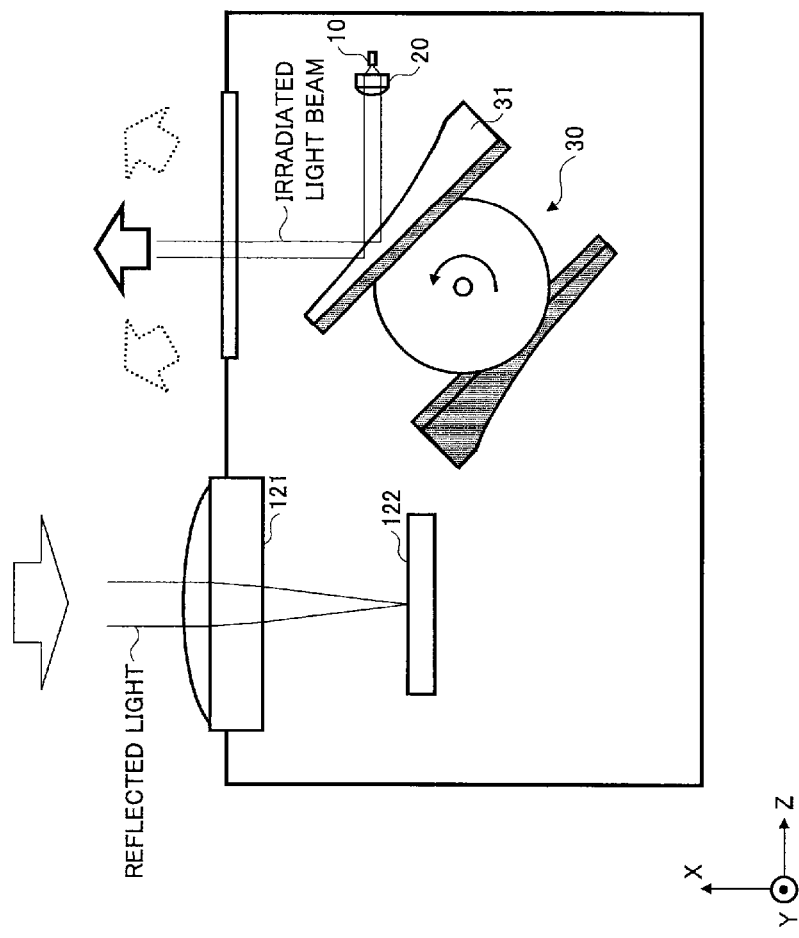
FIG. 25 is a diagram showing a laser radar unit according to a fifth embodiment of the present invention.

As is shown in FIG. 25, the laser radar unit according to the present embodiment has a light receiving element 122 and a light receiving lens 121 that irradiates light onto the light receiving element 122 arranged close to the optical scanner 30 that scans a light beam in the horizontal direction. When a light beam irradiated outside the laser radar unit by the optical scanner 30 (irradiated light beam) is irradiated on an object such as a preceding vehicle, an obstacle, or a road sign, for example, the light beam is reflected and scattered at this location and light beam components parallel to the irradiated light beam returns to the laser radar unit. The reflected light scattered by the object is collected by the light receiving element 121 of the laser radar unit and incident on the light receiving element 122. It is noted that the light receiving element 122 may be a conventional Si-PiN photodiode in the case where the laser radar unit is used to detect an object that is relatively close to the laser radar unit. In the case where the laser radar unit is used to detect an object located at least a few dozen meters away from the laser radar unit, an avalanche photodiode (AD) with higher sensitivity may preferably be used as the light receiving element 122.

Figure 26:
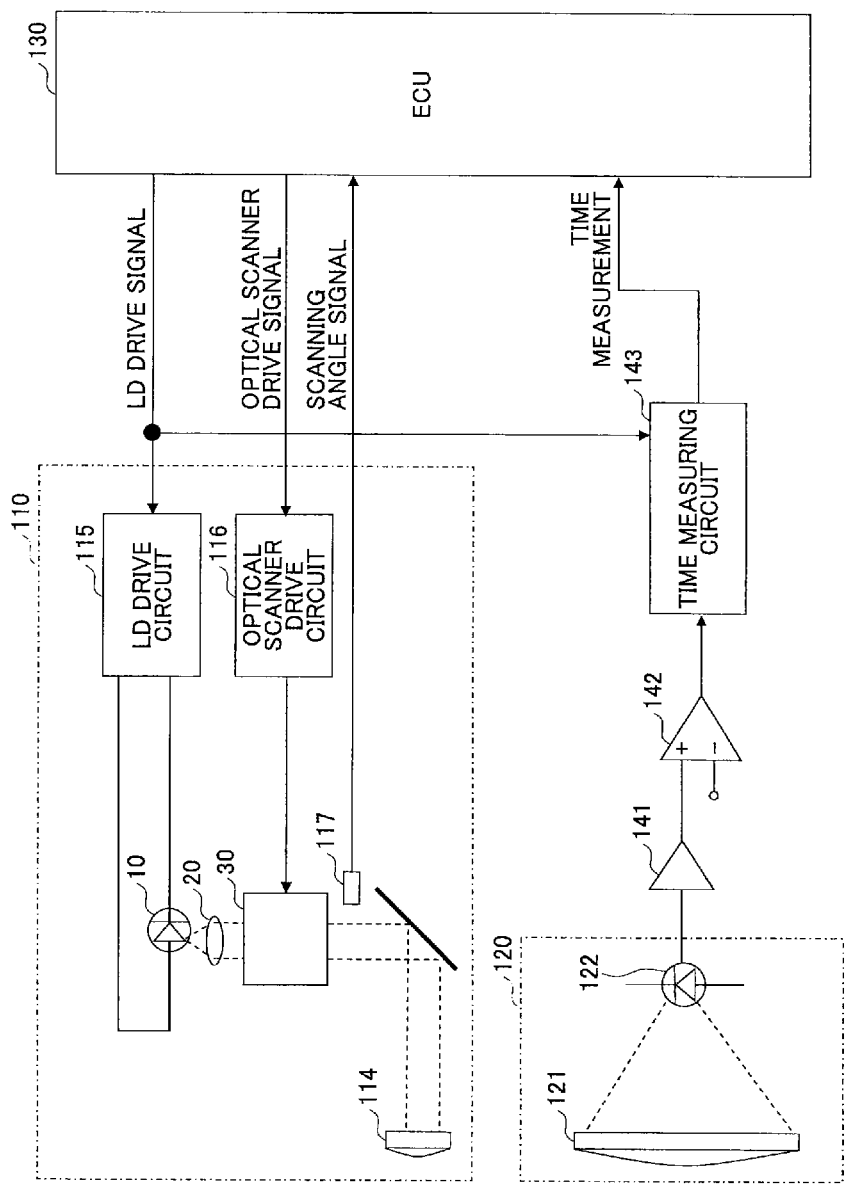
FIG. 26 is a block diagram showing a configuration of the laser radar unit according to the fifth embodiment.

FIG. 26 is a block diagram showing a configuration of the laser radar unit according to the present embodiment. As is shown in FIG. 26, the laser radar unit according to the present embodiment includes a light transmitting unit 110, a light receiving unit 120, and an ECU 130. It is noted that the light transmitting unit 110 and the light receiving unit 120 are preferably arranged at the front of a vehicle so that objects located ahead of the vehicle may be detected.

The light transmitting unit 110 includes the light source 10 including a semiconductor laser diode that irradiates pulsed laser light, the optical scanner 30, the input optical system 20, which may be a collimator lens, for example, that guides light from the light source 10 to the optical scanner 30, and an output optical system 114 that controls the inclining angle with respect to the road surface of a light beam that has passed through the optical scanner 30, for example. The light source 10 is connected to the ECU 130 via a LD drive circuit 115 and is configured to irradiate laser light according to a LD drive signal from the ECU 130. The optical scanner 30 is connected to the ECU 130 via an optical beam scanner drive circuit 116. The optical scanner repetitively scans a light beam irradiated from the light source 10 in the horizontal direction at a predetermined frequency. The scanning angle of the light beam from the optical scanner 30 is detected by a scanning angle monitor 117, is output to the ECU 130, and is used as feedback for an optical beam scanner drive signal to control the scanning angle and the scanning frequency.

The light receiving unit 120 includes the light receiving lens 121, and the light receiving element 122. Laser light reflected by an object located ahead of the vehicle enters the light receiving element 122 via the light receiving lens 121 and a mirror element (not shown), for example. The light receiving element 122 may include a photodiode, for example, and is configured to output an electric signal with a voltage corresponding to the intensity of the reflected light. The electric signal output from the light receiving element 122 is amplified by an amplifier 141 and output to a comparator 142. The comparator 142 compares the output voltage of the electric signal from the amplifier 141 with a reference voltage V0 and outputs a predetermined light receiving signal to a time measuring circuit 143 when the output voltage is greater than the reference voltage V0.

The time measuring circuit 143 also receives the LD drive signal that is output to the LD drive circuit 115 from the ECU 130 and outputs to the ECU 130 as time measurement data the time it takes for the predetermined light receiving signal to be generated after the LD drive signal is output; that is, the time difference between the time point at which the laser light is irradiated and the time point at which the reflected light is received as time measurement data to the ECU 130. Based on the time measurement data, the ECU 130 may calculate the distance of the object from the laser radar apparatus.

In the optical beam scanner according to an embodiment of the present invention, plural light beams each maintaining an adequate measuring range may be scanned. That is, even when scanning is performed over a wide angle in the horizontal direction, the irradiation range in the vertical direction does not substantially change and the irradiation range does not become narrower. In one embodiment, distance measurement may be performed by vertically dividing measuring areas according to the number of light beams that are scanned. It is noted that although examples in which the rotating polygon mirror has two mirrors are described above, in other embodiments the rotating polygon mirror may have three or more mirrors.

Sixth Embodiment

In the following, a laser radar unit according to a sixth embodiment of the present invention is described with reference to FIGS. 27-35.

Figure 27:
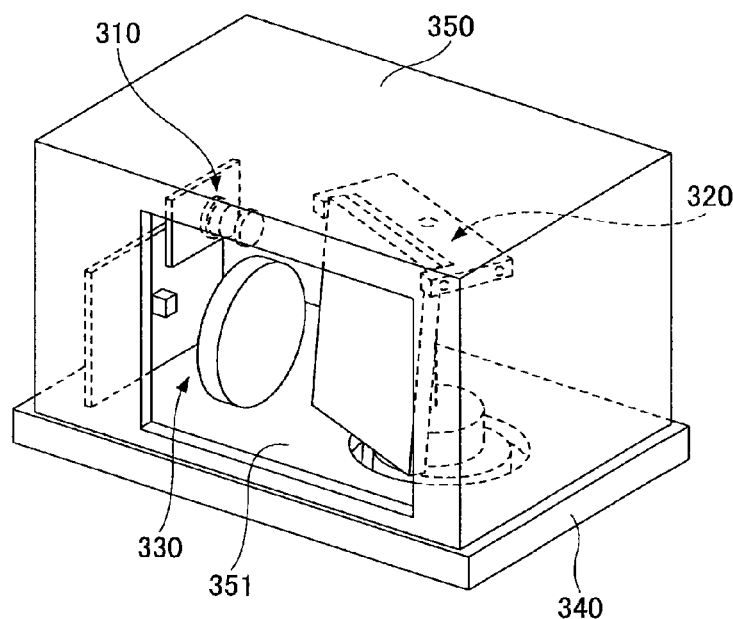
FIG. 27 is a perspective view of a laser radar unit according to a sixth embodiment of the present invention.
Figure 28:
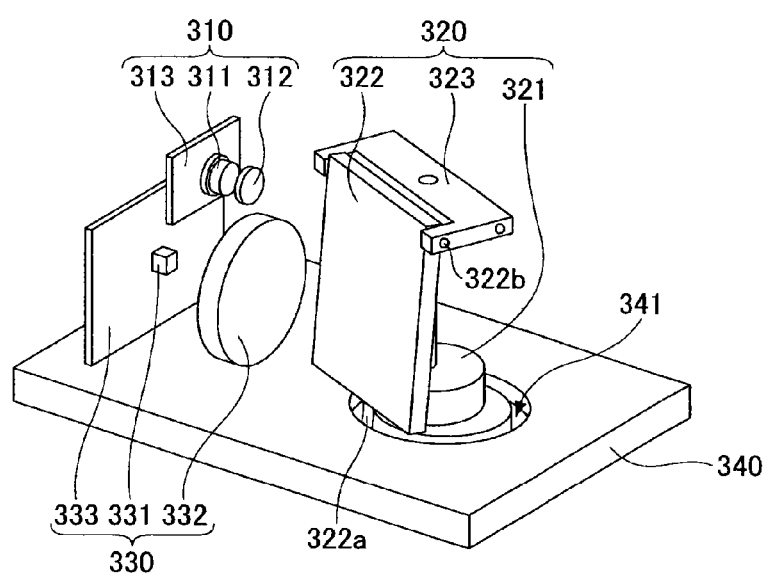
FIG. 28 is an internal perspective view of the laser radar unit according to the sixth embodiment.
Figure 29:
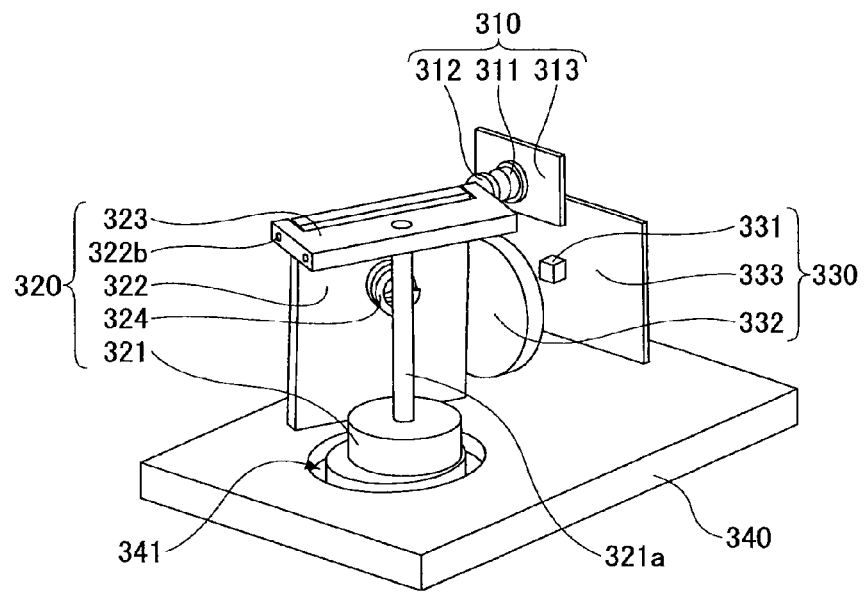
FIG. 29 is another internal perspective view of the laser radar unit according to the sixth embodiment.
Figure 30:
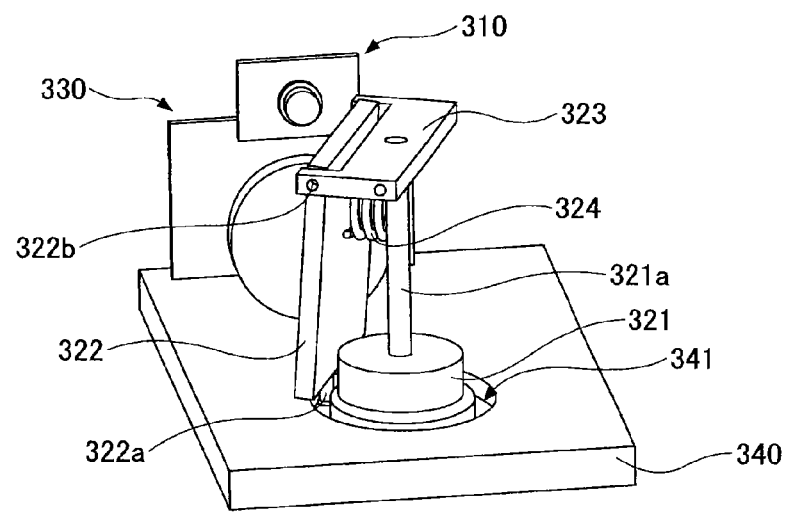
FIG. 30 is another internal perspective view of the laser radar unit according to the sixth embodiment.
Figure 31:
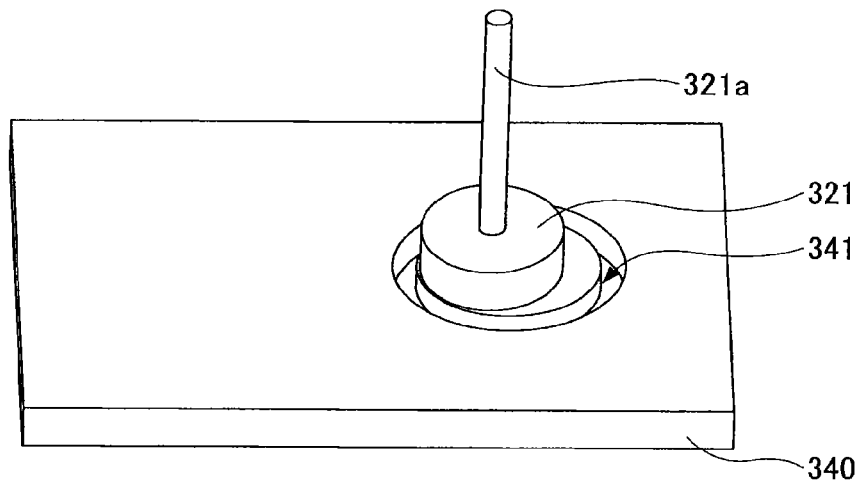
FIG. 31 is a perspective view of a base part of the laser radar unit according to the sixth embodiment.
Figure 32:
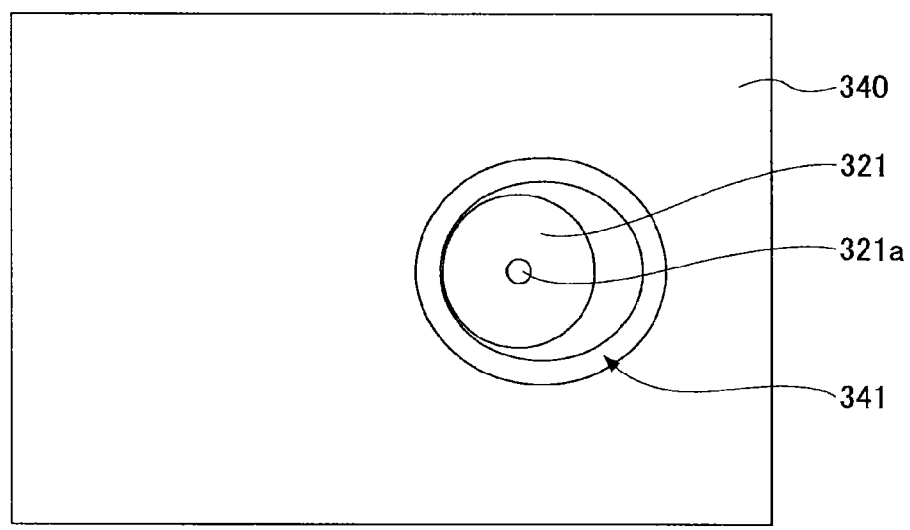
FIG. 32 is a top view of the base part of the laser radar unit according to the sixth embodiment.
Figure 33:
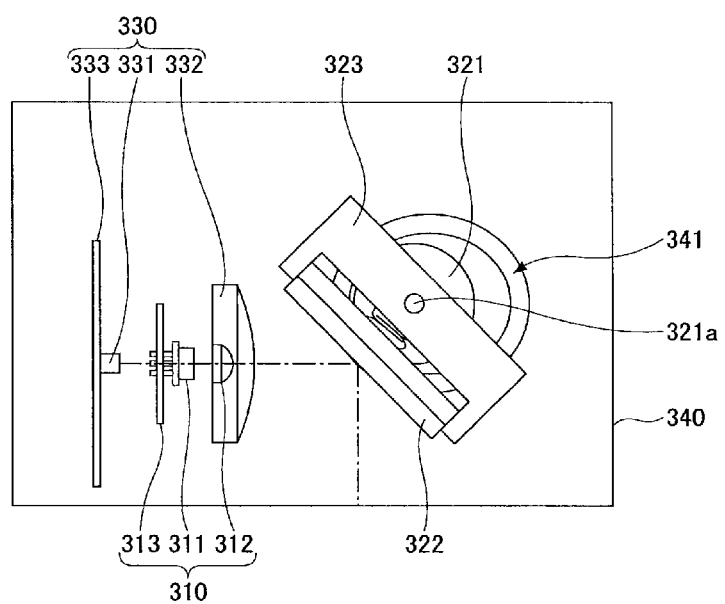
FIG. 33 is a top view of the laser radar unit according to the sixth embodiment.
Figure 34:
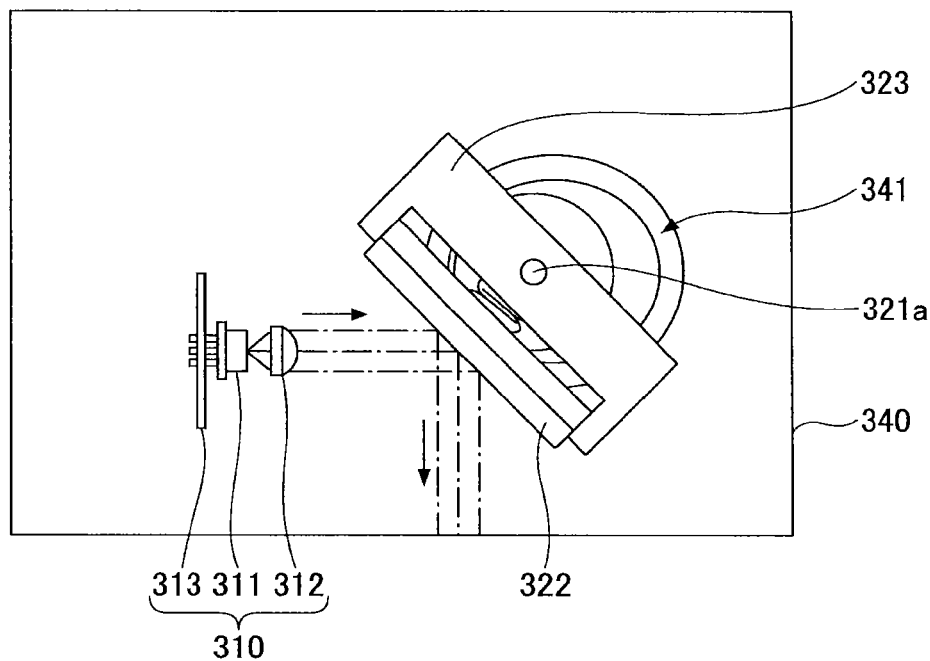
FIG. 34 is a diagram showing exemplary light paths of irradiated light and reflected light of the laser radar unit according to the sixth embodiment.
Figure 35:
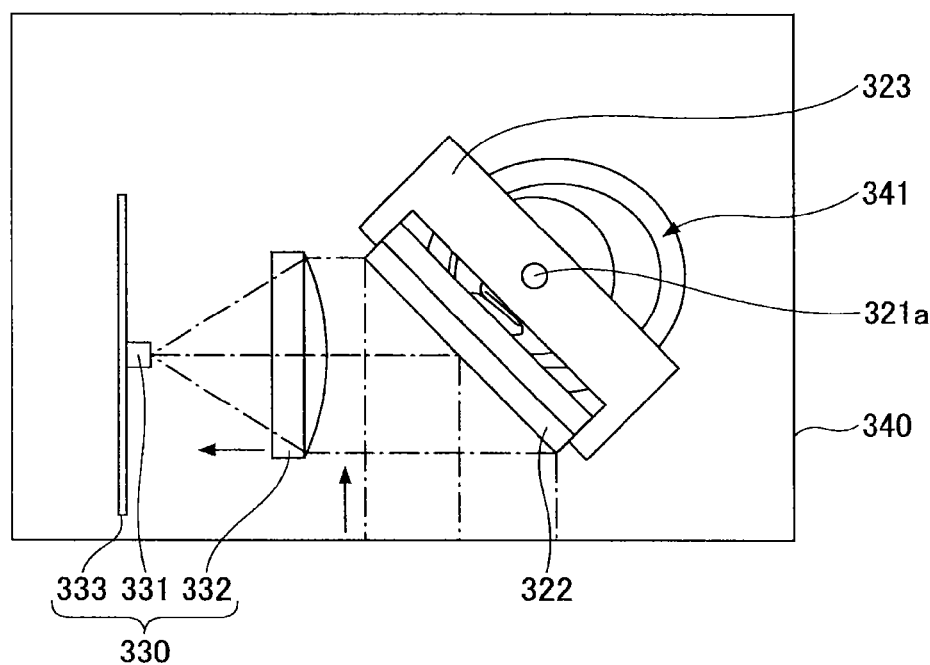
FIG. 35 is a diagram showing other exemplary light paths of irradiated light and reflected light of the laser radar unit according to the sixth embodiment.

FIG. 27 is a perspective view of the laser radar unit according to the present embodiment. FIGS. 28-30 are internal perspective views of the laser radar unit according to the present embodiment with a cover part 350 removed. FIG. 28 is a perspective view from the front side of a mirror 322, FIG. 29 is a perspective view from the rear side of the mirror 322, and FIG. 30 is a perspective view from a lateral side of the mirror 322. FIGS. 31 and 32 are a perspective view and a top view of a base part 340 and a motor 321. FIG. 33 is a top view of the laser radar unit according to the present embodiment with the cover part 350 removed. FIGS. 34 and 35 are diagrams showing the light paths of irradiated light and reflected light.

As is shown in FIGS. 27-28, the laser radar unit according to the present embodiment includes a light emitting unit 310 that irradiates a light beam, an optical scanning unit 320 that scans the light beam and irradiates the light beam from the laser radar unit, and a light detecting unit 330 that detects the light irradiated from the laser radar unit that is reflected by an object. The light emitting unit 310, the optical scanning unit 320, and the light detecting unit 330 are arranged inside a box made up of the base part 340 and the cover part 350 for blocking external light and preventing water and dust from penetrating inside. The cover part 350 includes a window 351 that is made of a material that allows light with the wavelength of the light emitted from the light emitting unit 310 to pass through. The light emitted from the light emitting unit 350 is irradiated outside via this window 351, and the reflected light enters the laser radar unit via this window 351.

The light emitting unit 310 includes a laser diode (LD) 311 that corresponds to a light source, a circuit board 313 for driving the LD 311, and a lens 312 that collimates the light irradiated from the LD 311 into substantially parallel light. These components of the light emitting unit 310 are fixed to the base part 340 by support members (not shown).

The optical scanning unit 320 deflects the light beam irradiated from the light emitting unit 310 in lateral and longitudinal directions. The optical scanning unit 320 includes a motor 321 corresponding to a rotating unit arranged on the base part 340, and a mirror 322 corresponding to a light reflecting unit. The motor 321 and the mirror 322 are connected to each other via a connection unit 323. That is, the motor is connected to the connection unit 323 by a rotational axis 321a of the motor 321, and the mirror 322 is connected to the connection unit 323 by a connection axis 322b that is perpendicular to the rotational axis 321a so that the mirror 322 may rotate around the connection axis 322b. It is noted that in the illustrated example, the connection axis 322b is directly mounted to the edge of the mirror 322; however, such a configuration is not necessary and in other embodiments a separate mounting member for mounting the mirror 322 to the connection axis 322b may be used, for example. The motor 321 corresponding to the rotating unit is arranged so that the rotational axis 321a is perpendicular to the surface of the base part 340. The motor 321 may be a stepping motor, a DC motor, or an AC motor, for example, and its rotation angle may be externally controlled by a rotation control unit (not shown), or the motor 321 may have a rotation control function for detecting the rotation angle and controlling the rotation angle.

As is shown in FIGS. 29 and 30, a spring 324 as an elastic member is arranged between the rear face of the mirror 322 corresponding to the light reflecting unit and the motor 321. The spring 324 may be applied a force in the direction pulling the mirror 322 toward the rotational axis 321a of the motor 321 or a force in the direction pushing the mirror 322 outward away from the rotational axis 321a of the motor 321.

As is shown in FIGS. 31 and 32, the base part 340 has a cam groove 341 arranged around the motor 321 in a predetermined shape. As is shown in FIGS. 28 and 30, the mirror 322 has a contact portion 322a that is inserted into the cam groove 341. By rotating the motor 321 around the rotational axis 321a, the contact portion 322a of the mirror 322 inserted into the cam groove 341 may move within the cam groove 341 to change the inclining angle of the mirror 322 with respect to the rotational axis 321a of the motor 321. It is noted that the inclining angle of the mirror 322 corresponds to an oscillation angle θ, which is described below.

The light detecting unit 330 includes a light detecting element 331 that receives reflected light that is reflected by an object (not shown) and outputs an electrical signal according to the light intensity of the received reflected light, a condensing lens 332 that directs the reflected light to the light detecting element 331, and a circuit board 333 having a circuit for driving the light detecting element 331, for example. In one embodiment, the light detecting element 331 may be a photodiode (PD); however, in the case where the amount of reflected light is small, an avalanche photodiode (APD) is preferably used as the light detecting element 331. It is noted that in the present embodiment, the condensing lens 332 and the circuit board 333 are fixed to the base part 340 by support members (not shown).

As is shown in FIG. 33, the light emitting unit 310 is arranged above the light detecting unit 330 so that the optical axis of the light beam irradiated from the light emitting unit 310 to the optical scanning unit 320 and the optical axis of the reflected light reflected by the optical scanning unit 320 to be detected by the light detecting unit 330 may substantially overlap when viewed from the top side of the base part 340. That is, the optical axis of the light beam irradiated from the light emitting unit 310 to the optical scanning unit 320 and the optical axis of the reflected light reflected by the optical scanning unit 320 to be detected by the light detecting unit 330 are on the same plane, which plane is parallel to the rotational axis 321a and perpendicular to the surface of the base part 340. The rotational axis 321a of the motor 321 is arranged to be shifted away from the extended lines of the optical axis of the light beam irradiated from the light emitting unit 310 and the optical axis of the reflected light detected by the light detecting unit 330.

It is noted that the substantial overlap of the optical axis of the light beam irradiated from the light emitting unit 310 to the optical scanning unit 320 and the optical axis of the reflected light reflected by the optical scanning unit 320 to be detected by the light detecting unit 330 is not limited to the illustrated example. In other embodiments, a portion of the optical axis of the light beam irradiated from the light emitting unit 310 to the optical scanning unit 320 right before entering the optical scanning unit 320 and a portion of the optical axis of the reflected light reflected by the optical scanning unit 320 to be detected by the light detecting unit 330 right after passing the optical scanning unit 320 may be arranged to substantially overlap while other portions of the light paths may be deflected by a mirror. For example, the light path of the light irradiated from the light emitting unit 310 may be left as is, and the light path of the reflected light reflected by an object may be changed by arranging a mirror in the light path after the reflected light is reflected by the optical scanning unit 320 and changing the orientation or position of the light detecting unit 330. In another example, the light path of the reflected light to be detected by the light detecting unit 330 may be left as is, and the light path of the light irradiated from the light emitting unit 310 to the optical scanning unit 320 may be changed by arranging a mirror between the light emitting unit 310 and the optical scanning unit 320 and changing the orientation or the position of the light emitting unit 310.

Also, in the illustrated embodiment, the rotational axis 321a of the motor 321 is shifted away from the extended lines of the optical axis of the light beam irradiated from the light emitting unit 310 and the optical axis of the reflected light to be detected by the light detecting unit 330. However, in other embodiments, the rotational axis 321a may be in alignment with these optical axes. The shifting distance of the rotational axis 321a may be determined based on the detection range (particularly in the horizontal direction) and vignetting by other components, for example.

As is shown in FIG. 34, in the laser radar unit according to the present embodiment, light emission by the LD 311 is controlled by a control unit (not shown) via the circuit board 313. A light beam irradiated from the LD 311 enters the lens 312 to be collimated into substantially parallel light after which the light is reflected by the mirror 322 and irradiated in predetermined directions outside the laser radar unit. The mirror 322 is configured to irradiate the light in predetermined directions both in the horizontal and vertical directions.

In the case where an object is located within the detection range of the laser radar unit, the light beam irradiated from the laser radar unit is reflected by the object. As is shown in FIG. 35, the reflected light reflected by an object is reflected by the mirror 322, collected by the condensing lens 332, incident on the light detecting element 331, and converted into an electrical signal that is transmitted to the circuit board 333. Based on the transmitted electrical signal, a processing unit (not shown) calculates the distance of the object based on the time it has taken for the reflected light to be detected after the light beam has been irradiated.

Figure 36:
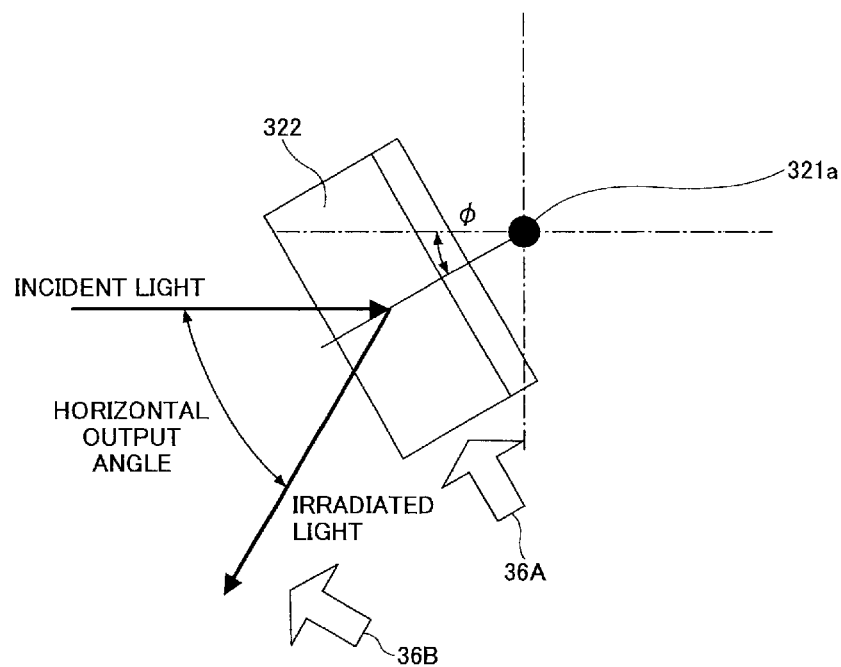
FIG. 36 is a top view of an optical scanning unit of the laser radar unit according to the sixth embodiment.
Figure 37:
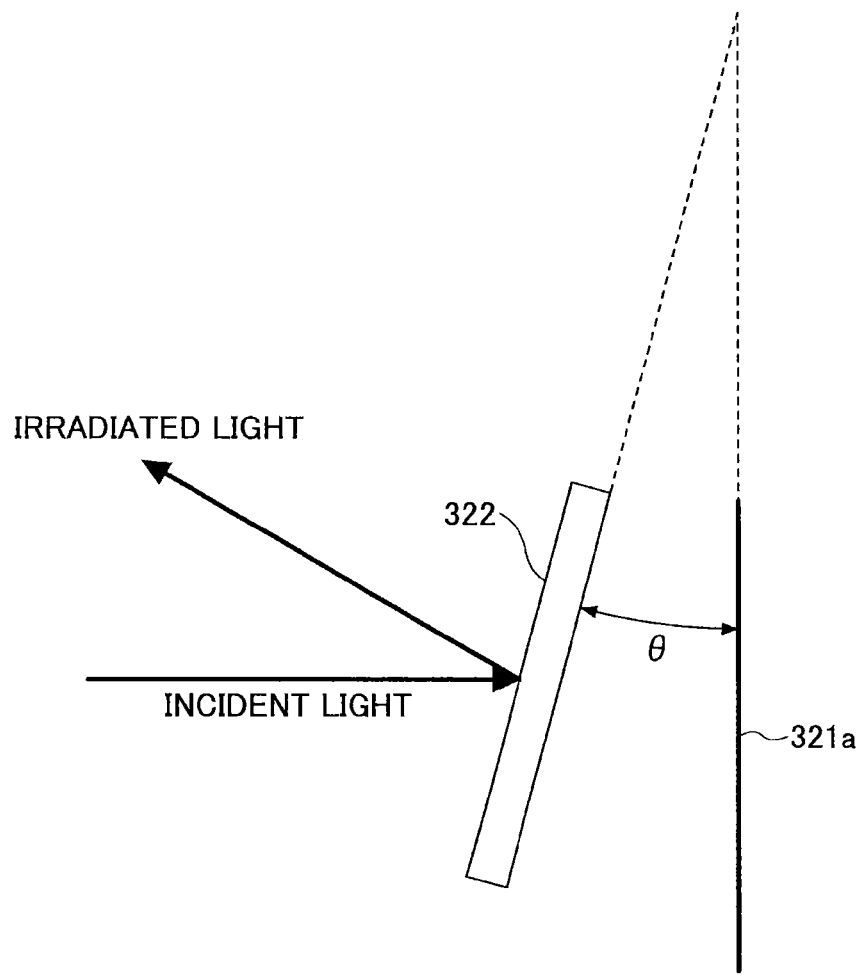
FIG. 37 is a perspective view of the optical scanning unit shown in FIG. 36.
Figure 38:
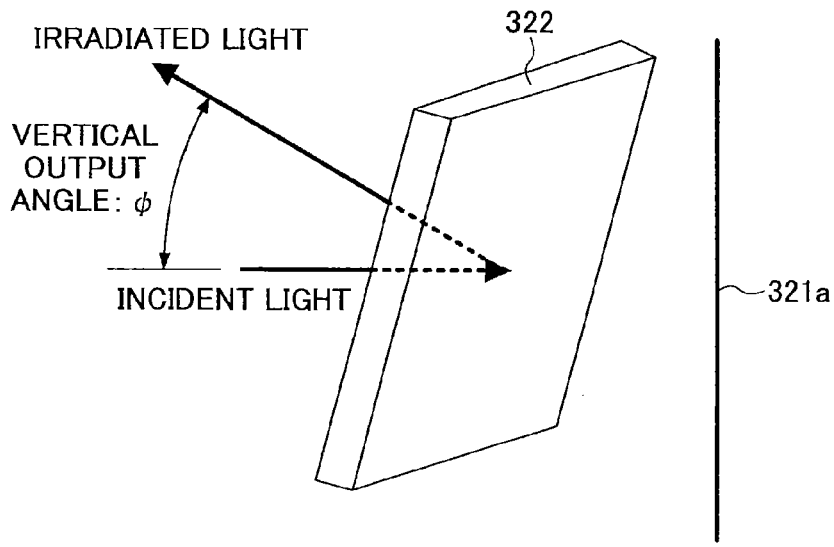
FIG. 38 is another perspective view of the optical scanning unit shown in FIG. 36.

In the following, the inclination of the mirror 322 is described with reference to FIGS. 36-39. FIG. 36 is a top view of the optical scanning unit 320. In FIG. 36, φ represents the mirror rotation angle of the mirror 322 corresponding to the angle of the normal line direction of the mirror surface of the mirror 322 with respect to the incident light on a plane perpendicular to the rotational axis 321a, and the horizontal output angle represents the angle of irradiated light that is reflected and irradiated by the mirror 322 with respect to incident light that is incident on the mirror 322. FIG. 37 is a perspective view of the optical scanning unit 320 from arrow 36A shown in FIG. 36. In FIG. 37, θ represents the oscillation angle corresponding to the inclining angle of the mirror 322 with respect to the rotational axis 321a. FIG. 38 is a perspective view of the optical scanning unit 320 from arrow 36B shown in FIG. 36, that is, a perspective view from a direction perpendicular to both the rotational axis 321a and the irradiated light. In FIG. 38, φ represents the vertical output angle corresponding to the angle of the irradiated light that is reflected and irradiated by the mirror 322 with respect to a plane that is perpendicular to the rotational axis 321a. It is noted that when the oscillation angle θ equals zero (θ=0), the horizontal output angle shown in FIG. 36 may be equal to the mirror rotation angle φ, and the vertical output angle φ may equal zero (φ=0). However the above relationship between the oscillation angle θ, the horizontal output angle, and the vertical output angle φ does not apply when the oscillation angle θ does not equal zero (θ≠0) as is described below.

Formulas 9-11 shown below represent the horizontal output angle, the vertical output angle φ, and the oscillation angle θ, respectively.

$$\text{Horizontal Output Angle} = \tan^{-1}\left(\frac{-\cos^2\theta \cdot \sin 2\phi}{1 - 2\cos^2\theta \cos^2\phi}\right) \quad \text{[Formula 9]}$$

$$\text{Vertical Output Angle } \phi = 90° - \cos^{-1}(\sin 2\theta \cos \phi) \quad \text{[Formula 10]}$$

$$\text{Oscillation Angle } \theta = 1/2 \cdot \sin^{-1}(\cos(90-\phi)/\cos\phi) \quad \text{[Formula 11]}$$

Figure 39:
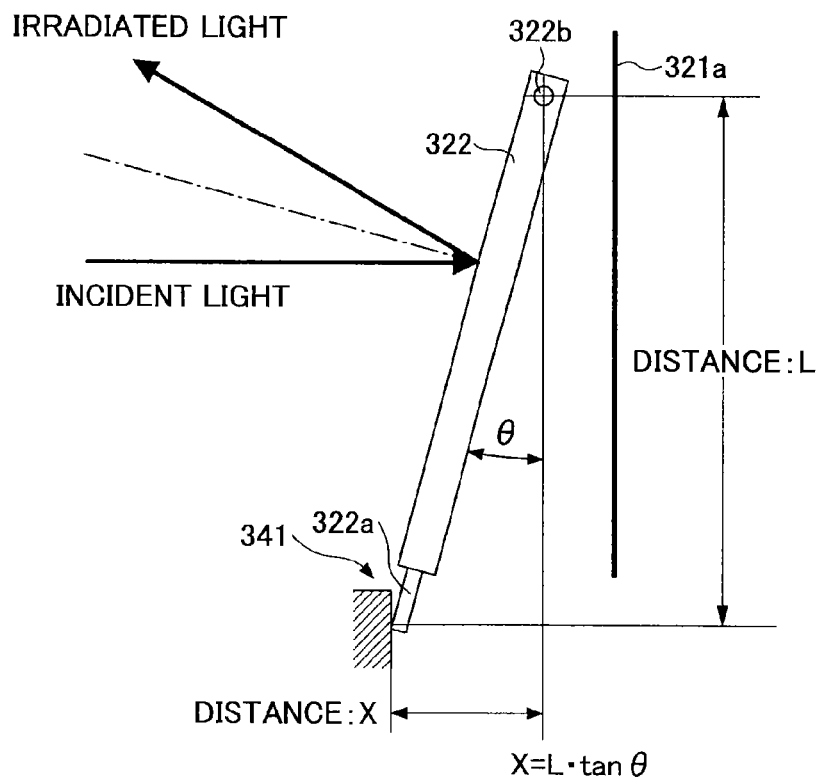
FIG. 39 is a diagram showing the oscillation amount of the optical scanning unit of the laser radar unit according to the sixth embodiment.

Formula 12 shown below represents an oscillation amount X based on the above Formulas 9-11, where L represents distance components in the parallel direction with respect to the rotational axis 321a from the connection axis 322b to the contact position of the connection member 322a with the side face of the cam groove 341, and X represents the oscillation amount corresponding to distance components in the vertical direction from the connection axis 322b to the contact position (see FIG. 39).

$$\text{Oscillation Amount } X = L \cdot \tan\theta \qquad \text{[Formula 12]}$$

$$= L \cdot \tan\left(1/2 \cdot \sin^{-1}\left(\frac{\cos(90-\varphi)}{\cos\phi}\right)\right)$$

Table 1 shown below indicates exemplary conditions of the optical scanning unit 320.

TABLE 1

| | |
|---|---|
| Oscillation Angle θ [°] when Mirror Rotation Angle φ = 0 | 0.4 |
| Mirror Length L [mm] | 50 |

Figure 40:
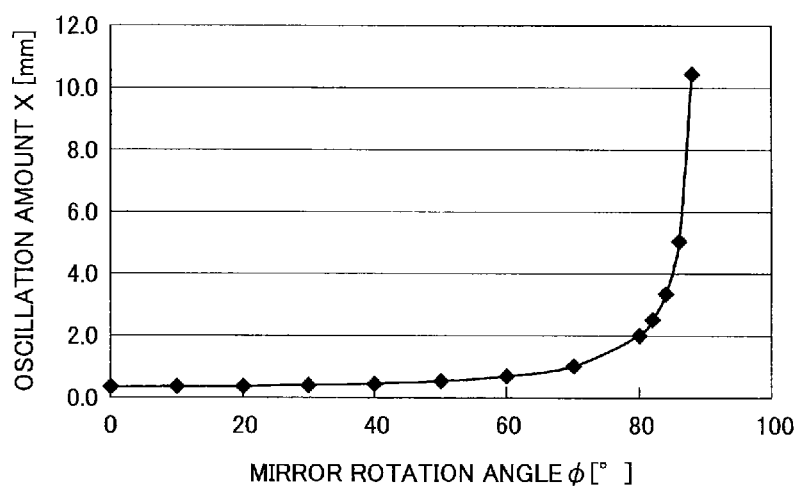
FIG. 40 is a graph showing the relationship between the mirror rotation angle and the oscillation amount of the of the optical scanning unit of the laser radar unit according to the sixth embodiment.

Table 2 shown below indicates the relationship between the mirror rotation angle φ and the oscillation amount X under the conditions specified in Table 1 based on Formula 12. FIG. 40 is a graph showing the calculation results of Table 2.

TABLE 2

| Mirror Rotation Angle φ [°] | Oscillation Amount X [mm] |
|---|---|
| 0 | 0.35 |
| 10 | 0.35 |
| 20 | 0.37 |
| 30 | 0.40 |
| 40 | 0.46 |
| 50 | 0.54 |
| 60 | 0.70 |
| 70 | 1.02 |
| 80 | 2.01 |
| 82 | 2.51 |
| 84 | 3.35 |
| 86 | 5.06 |
| 88 | 10.44 |

As can be appreciated from Table 2 and FIG. 40, the oscillation amount X abruptly increases as the mirror rotation angle φ comes closer to 90 degrees. It is noted that in the case where the mirror rotation angle φ is 90 degrees, the incident light beam irradiated from the light emitting unit 310 and the mirror surface of the mirror 322 become parallel so that the light beam cannot be deflected by the mirror 322. In the laser radar unit according to the present embodiment, the cam groove 341 is arranged so that a predetermined vertical output angle may be obtained based on the calculation results of Table 2, for example. That is, the cam groove 341 is arranged as is shown in FIGS. 31 and 32 so that the distance between the rotational axis 321a and the cam groove 341 (oscillation amount X) increases as the mirror rotation angle φ increases.

According to an aspect of the present embodiment, the contact portion 322a of the mirror 322 is arranged to move along the cam groove 341 so that a desired oscillation angle θ according to the mirror rotation angle φ may be obtained. In this way, light may be irradiated over a predetermined vertical output angle regardless of the position or orientation of the mirror 322. That is, in the present embodiment, a predetermined vertical output angle may be obtained regardless of the horizontal output angle. Also, reflected light of the same angle may be detected regardless of the horizontal output angle.

Figure 41C:
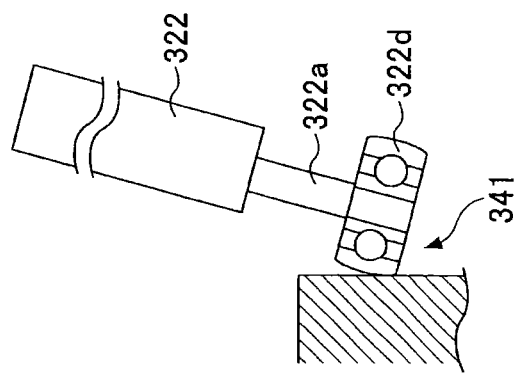
FIGS. 41A-41C are diagrams showing exemplary configurations of contact portions of a mirror of the optical scanning unit of the laser radar unit according to the sixth embodiment.
Figure 41B:
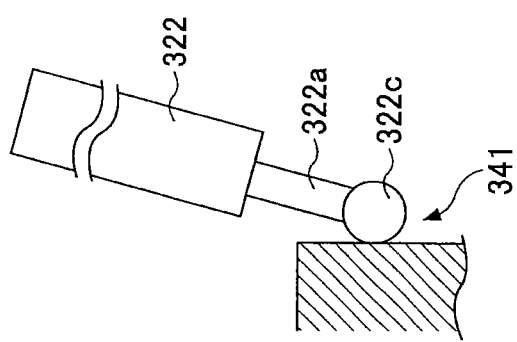
Figure 41A:
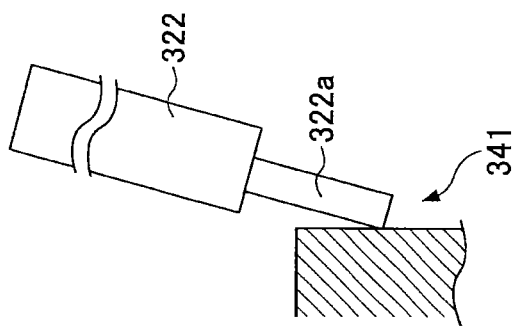

It is noted that the oscillation angle θ of the mirror 322 is determined by the oscillation amount X, and the oscillation amount X is determined by the contact position of the tip of the contact portion 322a of the mirror 322 with the side face of the cam groove 341. Thus, the contact portion 322a is always in contact with the side face of the cam groove 341. FIGS. 41A-41C are diagrams showing exemplary configurations of the contact portion 322a of the mirror 322. The contact portion 322a may be a round bar or some other bar structure as is shown in FIG. 41A; the contact portion 322a may have a spherical portion 322c arranged at its tip to enable point contact with the side face of the cam groove 341 as is shown in FIG. 41B; or the contact portion 322a may have a bearing portion 322d arranged at its tip to reduce contact resistance with the side face of the cam groove 341, for example. In one preferred embodiment, machine oil or some other substance may be used to reduce the frictional resistance between the tip of the contact portion 322a and the cam groove 341.

According to one aspect, the laser radar apparatus of the present embodiment may scan light at a predetermined vertical output angle even when the horizontal output angle is changed. Thus, the laser radar unit of the present embodiment may be installed in front of a vehicle and used in an automatic driving system to determine circumstances ahead of the moving vehicle over the horizontal direction at a level corresponding to the height of the vehicle to thereby improve driving safety, for example. According to another aspect of the present embodiment, in the case of increasing the number of scanning light beams to increase the vertical output angle, since the vertical output angle may be maintained substantially the same regardless of the horizontal output angle, object detection may be performed over a relatively wide vertical output angle using a relatively few number of light beams.

Seventh Embodiment

In the following, a laser radar unit according to a seventh embodiment of the present invention is described. The laser radar unit according to the present embodiment uses an actuator to control the oscillation angle θ of the mirror 322 instead of the cam groove 341.

Figure 42:
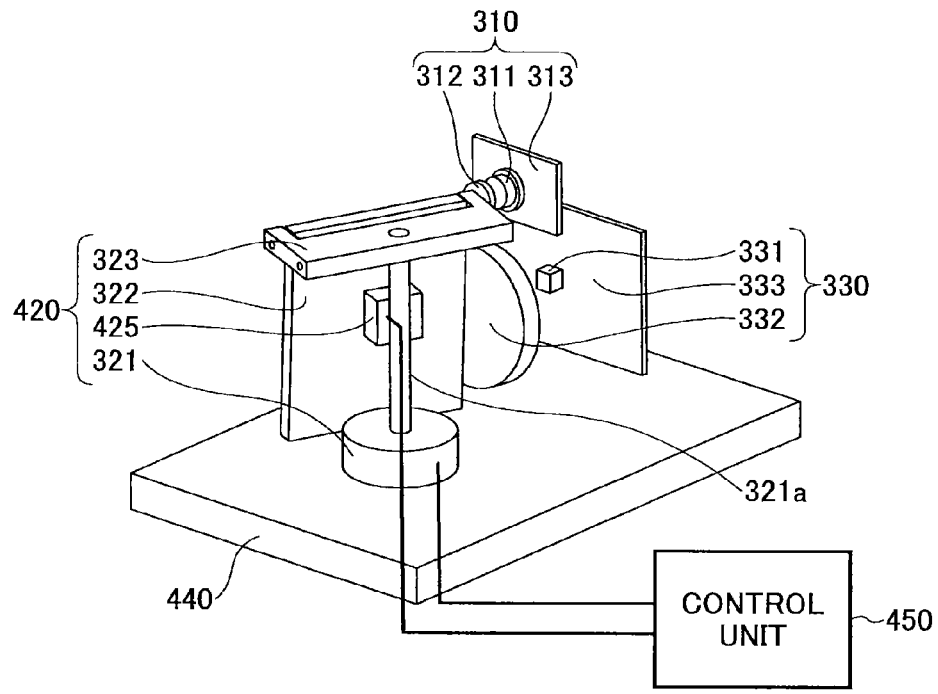
FIG. 42 is a perspective view of a laser radar unit according to a seventh embodiment of the present invention.

FIG. 42 is a perspective view of the laser radar unit according to the present embodiment. The laser radar unit of the present embodiment includes a base part 440 that does not have a cam groove and an optical scanning unit 420 that includes an actuator 425 for adjusting the oscillation angle θ of the mirror 322. It is noted that the optical scanning unit 420 of the present embodiment does not have a spring. Also, the laser radar unit of the present embodiment includes a control unit 450 that is connected to the motor 321 and the actuator 425.

The control unit 450 controls and directs the actuator 425 to expand and contract by a predetermined amount according to the rotation of the motor 321 (i.e., mirror rotation angle φ) so that the oscillation angle θ of the mirror 322 may be a predetermined angle. The control unit 450 has a computation function to calculate the relationship between the mirror rotation angle φ and the oscillation angle θ of the mirror 322. In one preferred embodiment, the motor 321 may include a sensor (not shown) for detecting the rotation angle of the motor 321 (i.e., mirror rotation angle φ). In this case, the expansion and contraction of the actuator 425 may be controlled according to the rotation angle of the motor 321 detected by the sensor so that the oscillation angle θ of the mirror 322 may be at a predetermined angle.

According to an aspect of the present embodiment, the oscillation angle θ of the mirror 322 may be controlled according to the mirror rotation angle φ as in the sixth embodiment so that a light beam may be scanned at a vertical output angle that remains substantially the same even when the horizontal output angle is changed.

It is noted that other features of the present embodiment may be identical to those of the sixth embodiment so that their descriptions are omitted.

Eighth Embodiment

In the following, a laser radar unit according to an eighth embodiment of the present invention is described with reference to FIGS. 43 and 44. The laser radar unit according to the present embodiment includes an optical scanning unit that has plural mirrors.

Figure 43:
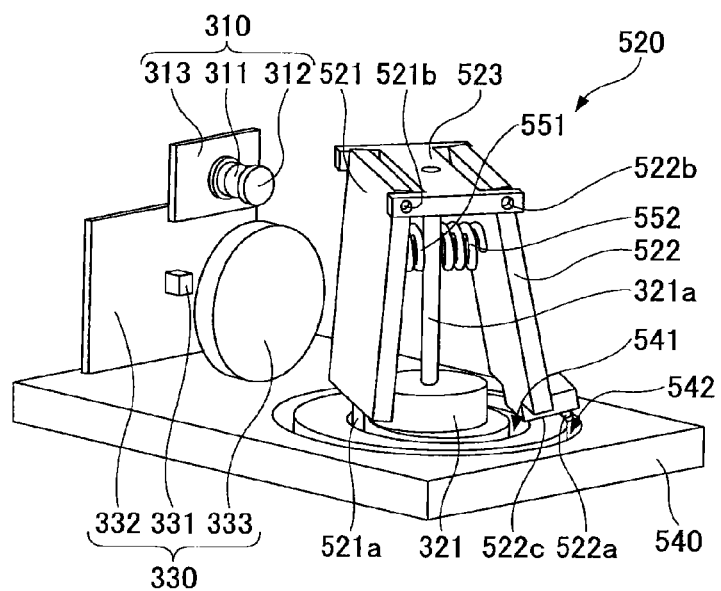
FIG. 43 is a perspective view of a laser radar unit according to an eighth embodiment of the present invention.
Figure 44:
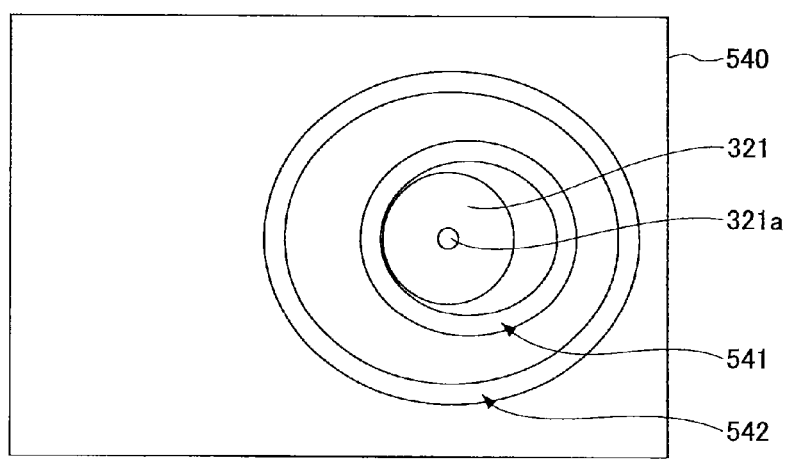
FIG. 44 is a top view of the laser radar unit according to the eighth embodiment.

FIG. 43 is a perspective view of the laser radar unit according to the present embodiment with the cover part removed. FIG. 44 is a top view of a base part 540 of the laser radar unit according to the present embodiment.

In the laser radar unit according to the present embodiment, the base part 540 includes two cam grooves 541, 542. Also, an optical scanning unit 520 of the laser radar unit according to the present embodiment includes two mirrors 521, 522 having rear sides facing each other, and a connection portion 532 for connecting the mirrors 521, 522 to the rotational axis 321a of the motor 321. The mirror 521 is connected to the connection portion 523 by a connection axis 521a that is perpendicular to the rotational axis 321a so that the mirror 521 may rotate around the connection axis 521a. The mirror 522 is connected to the connection portion 523 by a connection axis 522b that is perpendicular to the rotational axis 321a so that the mirror 522 may rotate around the connection axis 522a. The optical scanning unit 520 also includes a spring 551 that is arranged between the rear face of the mirror 521 and the rotational axis 321a, and a spring 552 that is arranged between the rear face of the mirror 522 and the rotational axis 321a. The mirror 521 includes a contact portion 521a that is inserted into the cam groove 541 and is arranged to move along the cam groove 541 while being in contact with the side face of the cam groove 541. Similarly, the mirror 522 includes a contact portion 522a that is inserted into the cam groove 542 and is arranged to move along the cam groove 542 while being in contact with the side face of the cam groove 542.

The cam groove 541 is arranged so that the mirror 521 may have a predetermined oscillation angle $θ_1$ when is it at a predetermined mirror rotation angle φ. The cam groove 542 is arranged so that the mirror 522 may have a predetermined oscillation angle $θ_2$ when is it at a predetermined mirror rotation angle φ. As is shown in FIG. 43, in the present embodiment, an offset portion 522a is arranged near the contact portion 522a of the mirror 522 so that the cam grooves 541, 542 would not overlap. It is noted that this offset portion 522c is preferably arranged to be relatively small.

In the laser radar apparatus according to the present embodiment, the oscillation angles $θ_1$, $θ_2$ of the two mirrors 521, 522 may be independently controlled so that light beams may be scanned over different vertical output angle ranges. In this way the overall vertical output angle range may be increased.

It is noted that the number of mirrors arranged in the optical scanning unit 520 is not limited to two, and in other embodiments, three or more mirrors may be provided. However, it is noted that when the arrangement of a mirror and a cam groove becomes relatively large, the offset needs to be increased as well. In such a case, the line connecting the oscillation center of the mirror and the oscillation point may be deviated with respect to the mirror surface. Thus, the offset may be taken into consideration in arranging the configuration of the cam groove.

It is noted that other features of the present embodiment may be identical to those of the sixth embodiment so that their descriptions are omitted.

According to one modified embodiment, in a case where an increased number of cam grooves is not desired when scanning light beams using multiple mirrors, a first mirror may be arranged to receive the cam movement and the cam movement may be transferred to one or more other mirrors via a link, for example. In this case, oscillation of the first mirror includes the oscillation necessary for the first mirror to project light as well as oscillation necessary for the other mirrors to project light. That is, the oscillation of the first mirror may cover a region over which the first mirror does not project any light.

It is noted that the cam groove configuration is not limited to that described above. In one embodiment, the cam groove may have at least one side of its side walls accurately configured to be a sliding surface for the contact portion of the mirror. In another embodiment, by accurately configuring both sides of the cam groove side wall, the contact portion of the mirror may move along either side of the cam groove wall so that a spring may not be necessary.

As described above, a laser radar unit according to an embodiment of the present invention may be configured to irradiate light from a LD at a predetermined vertical output angle and detect reflected light of the same angle regardless of the position of the mirror. In other embodiments, the laser radar unit may intentionally be configured to have the vertical output angle vary. For example, the mirror may be moved so that light is scanned over the center portion of a detection range at a relatively high position while light is scanned over the side edge portions of the detection range at a lower position. In other examples, the laser radar unit may be configured to perform diagonal scanning or ripple scanning. In this way, the scanning trajectory within a detection range may be arbitrarily controlled so that scanning may be performed over a desired detection range.

Further, the present invention is not limited to these embodiments, and numerous variations and modifications may be made without departing from the scope of the present invention.

The present application is based on and claims the benefit of the priority dates of Japanese Patent Application Nos. 2011-208009, 2011-209982, and 2012-147398 filed with the Japanese Patent Office on Sep. 22, 2011, Sep. 26, 2011, and Jun. 29, 2012, respectively, the entire contents of which are hereby incorporated by reference.

What is claimed is:

1. An optical beam scanner comprising:
a light source;
an optical scanner configured to scan a light beam irradiated from the light source; and
an input optical system configured to direct the light beam irradiated from the light source to the optical scanner,
wherein the optical scanner includes a rotating mirror configured to rotate around a rotational axis and reflect the light beam irradiated from the light source;
the rotating mirror is rotated around the rotational axis so that the light beam is irradiated on differing positions of a mirror surface of the rotating mirror; and the mirror surface of the rotating mirror has a mirror surface inclining angle with respect to a direction parallel to the rotational axis, the mirror surface inclining angle gradually increasing from a first side to a second side of the mirror surface in a direction parallel to a plane perpendicular to the rotational axis.

2. The optical beam scanner as claimed in claim 1, wherein on the plane perpendicular to the rotational axis, a first incident angle to the mirror surface of the light beam that is irradiated on the mirror surface at the first side of the mirror surface is greater than a second incident angle to the mirror surface of the light beam that is irradiated on the mirror surface at the second side of the mirror surface.

3. The optical beam scanner as claimed in claim 1, wherein the light beam is irradiated on the mirror surface so that an optical axis of the light beam is positioned away from the rotational axis by a distance of at least 0.8 times a rotation radius of the rotating mirror and no more than 1.0 times the rotation radius.

4. The optical beam scanner as claimed in claim 1, wherein the mirror surface includes a first region in which the mirror surface inclining angle gradually increases in the direction parallel to the plane perpendicular to the rotational axis, and a second region in which the mirror surface inclining angle is substantially the same.

5. The optical beam scanner as claimed in claim 1, wherein the mirror surface includes two differing regions in which the mirror surface inclining angle gradually increases in the direction parallel to the plane perpendicular to the rotational axis; and
the two differing regions are connected by a point at which the gradual increase in the mirror surface inclining angle becomes discontinuous.

6. The optical beam scanner as claimed in claim 1, wherein a length of the mirror surface in the direction parallel to the plane perpendicular to the rotational axis is at least 5 W and no more than 12 W, where W represents a width of the light beam in the direction parallel to the plane perpendicular to the rotational axis.

7. The optical beam scanner as claimed in claim 1, wherein a length of the mirror surface in the direction parallel to the plane perpendicular to the rotational axis is at least two times a rotation radius of the rotating mirror.

8. A laser radar unit comprising:
an optical beam scanner including a light source;
an optical scanner configured to scan a light beam irradiated from the light source;
an input optical system configured to direct the light beam irradiated from the light source to the optical scanner; and
a light receiving unit configured to receive light reflected by an object that is irradiated by the light beam irradiated from the optical beam scanner,
wherein the optical scanner includes a rotating mirror configured to rotate around a rotational axis and reflect the light beam irradiated from the light source,
the rotating mirror is rotated around the rotational axis so that the light beam is irradiated on different positions of a mirror surface of the rotating mirror, and
the mirror surface of the rotating mirror has a mirror surface inclining angle with respect to a direction parallel to the rotational axis, the mirror surface inclining angle gradually increasing from a first side to a second side of the mirror surface in a direction parallel to a plane perpendicular to the rotational axis.

9. A laser radar unit comprising:
a light emitting unit;
a light scanning unit configured to scan a light beam irradiated from the light emitting unit; and
a light receiving unit configured to receive light reflected by an object that is irradiated by the light beam irradiated from the light scanning unit
wherein the light scanning unit includes a light reflecting unit configured to reflect the light beam irradiated from the light source and a rotating unit configured to rotate the reflecting unit around a rotational axis, the light beam being scanned by rotating the rotating unit, the light reflecting unit including a mirror surface,
the light reflected by the object is reflected by the mirror surface of the light reflecting unit of the light scanning unit and irradiated on the light receiving unit, and
an inclining angle of the mirror surface of the light reflecting unit is adjusted according to a rotation angle of the light reflecting unit.

10. The laser radar unit as claimed in claim 9, wherein the inclining angle of the mirror surface of the light reflecting unit is adjusted according to the rotation angle of the light reflecting unit so that a vertical output angle of irradiated light with respect to a plane perpendicular to the rotational axis is at a predetermined angle when the light beam is scanned.

11. The laser radar unit as claimed in claim 9, wherein an oscillation angle corresponding to the inclining angle of the mirror surface of the light reflecting unit with respect to the rotational axis is adjusted according to the rotation angle of the light reflecting unit so that $90°-\cos^{-1}(\sin 2\theta \cos \phi)$ equals a predetermined value, where $\theta$ represents the oscillation angle of the mirror surface of the light reflecting unit and $\phi$ represents the rotation angle of the light reflecting unit.

12. The laser radar unit as claimed in claim 9, further comprising:
a base part including a cam groove, the rotation unit being arranged on the base part so that the rotational axis is perpendicular to a surface of the base part; and
a connection portion configured to connect the light reflecting unit to the rotational axis;
wherein a first edge portion of the light reflecting unit is connected to the connection portion by a connection axis that is arranged in a perpendicular direction with respect to the rotational axis so that the light reflecting unit rotates around the connection axis;
the connection portion is connected to the rotational axis;
a second edge portion of the light reflecting unit includes a contact portion that is inserted into the cam groove of the base part; and
the contact portion moves along the cam groove when the light reflecting unit is rotated.

13. The laser radar unit as claimed in claim 12, wherein an oscillation amount of the light reflecting unit corresponding to distance components in a perpendicular direction with respect to the rotational axis from the connection axis to the second edge portion of the light reflecting unit is adjusted to equal $L \cdot \tan(1/2 \cdot \sin^{-1}(\cos (90-\phi)/\cos \phi))$, where $\phi$ represents the rotation angle of the mirror surface of the light reflecting unit, and L represents a vertical output angle corresponding to an angle with respect to a plane perpendicular to the rotational axis of irradiated light that is reflected and irradiated by the light reflecting unit, and L represents distance components in a parallel direction with respect to the rotational axis from the connection axis to the second edge portion of the light reflecting unit.

14. The laser radar unit as claimed in claim 9, further comprising:
- a base part on which the rotation unit is arranged so that the rotational axis is perpendicular to a surface of the base part;
- a connection portion configured to connect the light reflecting unit to the rotational axis; and
- an actuator configured to control the inclining angle of the mirror surface of the light reflecting unit;
- wherein an edge portion of the light reflecting unit is connected to the connection portion by a connection axis that is arranged in a perpendicular direction with respect to the rotational axis so that the light reflecting unit rotates around the connection axis;
- the connection portion is connected to the rotational axis; and
- the actuator adjusts the inclining angle of the mirror surface of the light reflecting unit.

15. The laser radar unit as claimed in claim 9, wherein a first optical axis of the light beam that is irradiated from the light emitting unit towards the optical scanning unit includes a first optical axis portion right before entering the optical scanning unit, a second optical axis of the light reflected by the optical scanning unit to be detected by the light receiving unit includes a second optical axis portion right after passing the optical scanning unit, and the first optical axis portion and the second optical axis portion are arranged to be coplanar.

* * * * *